United States Patent
Scoullar et al.

(10) Patent No.: US 11,079,502 B2
(45) Date of Patent: Aug. 3, 2021

(54) METHOD AND APPARATUS FOR RESOLVING SIGNALS IN DATA

(71) Applicant: SOUTHERN INNOVATION INTERNATIONAL PTY LTD., Carlton North (AU)

(72) Inventors: Paul Andrew Basil Scoullar, Fitzroy North (AU); Christopher Charles McLean, Kennington (AU); Shane Michael Tonissen, Kensington (AU)

(73) Assignee: Southern Innovation International Pty Ltd, Carlton North (AU)

( * ) Notice: Subject to any disclaimer, the term of this patent is extended or adjusted under 35 U.S.C. 154(b) by 0 days.

(21) Appl. No.: 15/102,852

(22) PCT Filed: Dec. 11, 2014

(86) PCT No.: PCT/AU2014/050420
§ 371 (c)(1),
(2) Date: Jun. 8, 2016

(87) PCT Pub. No.: WO2015/085372
PCT Pub. Date: Jun. 18, 2015

(65) Prior Publication Data
US 2016/0313459 A1 Oct. 27, 2016

Related U.S. Application Data
(60) Provisional application No. 61/914,912, filed on Dec. 11, 2013.

(51) Int. Cl.
*G01T 1/36* (2006.01)
*G01T 1/17* (2006.01)
(Continued)

(52) U.S. Cl.
CPC .............. *G01T 1/366* (2013.01); *G01T 1/171* (2013.01); *G06F 17/148* (2013.01); *G06F 30/20* (2020.01); *G06F 2111/10* (2020.01)

(58) Field of Classification Search
CPC ...................................................... G01T 1/366
See application file for complete search history.

(56) References Cited

U.S. PATENT DOCUMENTS

| 3,919,883 A | * | 11/1975 | Nakamura | ............... | G01H 1/00 |
| | | | | | 73/587 |
| 6,707,307 B1 | * | 3/2004 | McFarlane | ............. | G01N 22/00 |
| | | | | | 324/617 |

(Continued)

FOREIGN PATENT DOCUMENTS

| WO | WO 2006/029475 A1 | 3/2006 |
| WO | WO 2012/171059 A1 | 12/2012 |

OTHER PUBLICATIONS

International Search Report and Written Opinion dated Mar. 16, 2015 for International Patent Application No. PCT/AU2014/050420.

(Continued)

*Primary Examiner* — Hyun D Park
(74) *Attorney, Agent, or Firm* — Knobbe, Martens, Olson & Bear, LLP

(57) ABSTRACT

A method and apparatus for resolving individual signals in detector output data are disclosed. One inventive aspect includes a processing circuit configured to receive detector output data wherein the detector output data may be stepped data or non-stepped data; transform the detector output data to produce stepped data wherein the detector output data is received as non-stepped data; detect at least one signal at least partially based on the stepped data; and estimate a parameter associated with the signal, wherein estimating the (Continued)

parameter may preferably comprise estimating a signal energy or signal time of arrival associated with the signal.

31 Claims, 18 Drawing Sheets

(51) Int. Cl.
*G06F 30/20* (2020.01)
*G06F 17/14* (2006.01)
*G06F 111/10* (2020.01)

(56) References Cited

U.S. PATENT DOCUMENTS

| | | | |
|---|---|---|---|
| 2003/0042916 A1* | 3/2003 | Anderson | G01N 22/04 324/643 |
| 2007/0147702 A1* | 6/2007 | Scoullar | G01T 1/171 382/276 |
| 2009/0032715 A1 | 2/2009 | Mott | |
| 2009/0034682 A1 | 2/2009 | Mott | |
| 2011/0251828 A1 | 10/2011 | Scoullar et al. | |

OTHER PUBLICATIONS

Knoll et al., Radiation Detection and Measurement, John Wiley and Sons, NY 2000, 3$^{rd}$ Edition, Chapter 17, pp. 632-634 and 658-659.
Pullia et al., Quasi-optimum gamma and X spectroscopy based on real-time digital techniques, Nucl Instr Meth. A, (2000) 439:378-384.
Komar et al., Digital signal processing for BGO detectors, Nucl Instr Meth A, (1993) 336: 246-252.
Saito, Naoki, Superresolution of Noisy Band-Limited Data by Data Adaptive Regularization and its Application to Seismic Trace Inversion, CH2847-2/90/0000-1237, (1990).
Scates et al., A comparison of the high count-rate performance of three commercially available digital signal processors, Appl. Radiat. Isot., vol. 63, pp. 465-473 (2005).
Novak et al., Gauss-Seidel Iterative Method as a Real-Time Pile-Up Solver of Scintillation Pulses, IEEE Trans. Nucl. Sci., vol. 56(6), pp. 3680-3687 (2009).
Riboldi et al., Experimental Comparison of State-of-the-Art Methods for Digital Optimum Filter Synthesis With Arbitrary Constraints and Noise, IEEE Trans. Nucl. Sci., vol. 52(4), pp. 954-958 (2005).

* cited by examiner

METHOD AND APPARATUS FOR RESOLVING SIGNALS IN DATA

CROSS-REFERENCE TO RELATED APPLICATIONS

This application is a U.S. National Phase of International Application No. PCT/AU2014/050420, filed Dec. 11, 2014, which claims the benefit of U.S. Provisional Application No. 61/914,912, filed, Dec. 11, 2013, the contents of which are respectively incorporated herein by reference in their entirety.

BACKGROUND OF THE INVENTION

Field of the Invention

The present invention relates generally to a method and apparatus for determining parameters of signals from (typically noisy) detector output data, for use—in particular though not exclusively—for the recovery, from a radiation detector, of data affected by pulse pile-up Background The accurate detection and measurement of radiation, vibration or other types of energy, is employed in many industries including homeland security, scientific instrumentation, medical diagnostics materials analysis, meteorology, freight and logistics, information and communication technology (ICT) and the mineral processing industry. These and other industries use such detection and measurement to analyze materials, structures, products, information, signals or other specimens. Transmission based imaging, spectroscopic analysis or other modalities can be used to perform such analysis.

In mineral and oil exploration, borehole-loading techniques use gamma rays and neutrons to determine the subsurface content of rocks and mineral deposits. Data on the porosity and density of rock formations can be determined from nuclear borehole logging techniques, which is then used to help detect the presence of geological reservoirs and their contents (e.g. oil, gas or water).

In freight and logistics, X-ray scanning is used not only to scan cargo for security purposes detection of illicit substances or explosives), but may also be used to measure weight, volume and load distribution in order to determine pricing and generate manifests. Sound navigation and ranging (SONAR) may be used in navigation and for locating objects within a body of water. Sonic detection and ranging (SODAR) may be used to measure the scattering of sound waves by atmospheric turbulence and for example to measure wind speed at various heights above the ground, and the thermodynamic structure of the lower layer of the atmosphere.

Ultrasound may be used for medical imaging or other purposes, such as to form images of fetuses, to locate flaws in and/or measure the thickness of certain types of objects, or to conduct real-time location of objects (for ex ample in manufacturing environments).

SUMMARY OF THE INVENTION

The present invention relates to a digital signal processing technique capable of accurately estimating, in real-time, parameters of incoming radiation detection events, enabling the recovery of information from piled-up events.

According to a first aspect of the invention, there is provided a method and apparatus for resolving individual signals in detector output data. The method comprises: receiving detector output data transforming the detector output data to produce stepped data detecting at least one signal at least partially based on the stepped data; and estimating a parameter associated with the signal. The apparatus comprises a processing circuit configured to perform the steps of the method.

According to a second aspect of the invention, there is provided a method and apparatus for resolving individual signals in detector output data. The method comprises: receiving stepped detector output data; detecting at least one signal at least partially based on the stepped data; and estimating a parameter associated with the signal. The apparatus in the second aspect also comprises a processing circuit configured to perform the steps of the method.

In some embodiments, the estimated parameter is one or more of a signal energy or a time of arrival of the signal.

In some embodiments, the method further comprises: determining the amplitude of a signal in the stepped data at least partially based on the difference between an average value of the stepped data stream following the signal and an average value of the stepped data prior to the signal; and estimating the signal energy at least partially based on the amplitude of the signal.

It will be appreciated that it may not be possible to adequately characterize all data (uncharacterized data is termed 'corrupt data'); such corrupt data may optionally be rejected. As such, in some embodiments, the method further comprises: generating a model of the detector output data at least partially based on the estimated signal energy; determining the difference between the model and the detector output data; and reject portions of the model that differ from the detector output data by more than a threshold.

In one exemplary embodiment of the invention, the method includes creating a model of the detector output using the signal parameters in combination with the detector impulse response. The method may include discarding energy estimates deemed not sufficiently accurate. In one embodiment, the method includes presenting all sufficiently accurate energy estimates in a histogram.

In some embodiments, wherein the detector output data comprises a plurality of samples representing at least one signal, the method further comprises transforming the detector output data at least partially based on transforming the signal into a stepped signal, wherein transforming the signal into the transformed signal comprises: modeling the signal at least partially based on a rising edge variable and a falling edge variable; transforming the rising edge variable such that the rising time of the signal is substantially zero; and transforming the falling edge variable such that the falling time of the signal is substantially infinite.

In some embodiments, the method further comprises modeling the signal at least partially based on a double-exponential waveform, wherein the double-exponential waveform is given by:

$$p(t)=A\cdot(e^{-at}-e^{-bt})$$

$p(t)=A\cdot(e^{-at}-e^{-bt})$ where: p(t) is the signal,
A is the signal energy,
a is the rising edge variable, and
b is the falling edge variable.

In some embodiments, the method further comprises performing transformation of the signal by the following operation:

$$y(k)=y(k-1)+x(k)-x(k-1)\cdot(e^{-a}+e^{-b})+x(k-2)\cdot e^{-a}\cdot e^{-b}$$

where:
x(n) is the incoming data stream value at sample 'n'
a, b determine the falling and rising edges of the signal shape
(n) is the stepped data stream, which may require further scaling.

In some embodiments, the method further comprises deleting at least one of the samples within a window surrounding the rising edge of the signal.

In some embodiments, the method further comprises detecting the at least one signal by determining one or more detection metrics, wherein the one or more detection metrics are determined by fitting an expected signal shape to one or more sliding windows of samples in the stepped data, and estimating a parameter fit between the expected signal shape and the stepped data for each window; analyzing one or more of the detection metrics; and determining if there are any signals in the stepped data based on said analysis of the one or more detection metrics.

In some embodiments, the method further comprises comparing one or more detection metrics to a threshold; or, modeling one or more detection metrics with a quadratic approximation applied to one or more sliding windows of the detection metric data, and comparing quadratic coefficients of a plurality of sliding windows of the detection metric.

In some embodiments, the method further comprises determining the one or more detection metrics at least partially based on a least-squares fit of the expected signal shape with the stepped data, where the detection metrics are given by:

$$\hat{x}(k) = (A^T \cdot A)^{-1} \cdot A^T \cdot b(k)$$

where; k is the sample,
x(k) is the detection metric for sample k,
b(k) is a segment of the stepped data, centred on sample k, and
A is the vector of the centred expected signal shape.

In some embodiments, the method further comprises incrementally updating the one or more detection metric at least partially based on the previous detection metric using addition, subtraction, and/or scaling.

In some embodiments, the method further comprises discarding signals which are separated horn the at least one signal by less than a threshold number of samples.

In some embodiments, the method further comprises transforming the detector output data at least partially based on convolving a finite impulse response filter (FIR) with the detector output data.

The method optionally comprises an assessment of variance of the energy estimations in the data, and validation of the modeled data.

In some embodiments, the apparatus comprises a processing circuit configured to perform each the steps of the method. In other embodiments, the apparatus comprises other means to perform the steps of the method.

The apparatus may comprise any suitable apparatus for which pulse pile-up recovery is useful. For example, it may be a metal detector, a landmine detector, a medical imaging apparatus, a mineral detection apparatus, an oil well logging apparatus, an unexploded ordnance detector, a cargo screening apparatus, an X-ray fluorescence apparatus or an X-ray diffraction apparatus. The apparatus of this aspect comprises a processor for receiving the data in digitized form, adapted to perform the signal processing method described above. The apparatus may include an analog to digital converter (ADC) adapted to receive the data, to convert the data into digitized form, and forward to digitized data to the processor. This is of particular use where the detector outputs analog data but is unnecessary where the detector outputs digitized data.

The processor may for example comprise a field programmable gate array (or an array thereof), a digital signal processor (or an array thereof), or a combination of the two. The apparatus may include an analog front end that includes the analog to digital converter (ADC).

The apparatus may for example include an electronic computing device in data communication with the processor, for controlling the processor and for displaying an output of the processor. The apparatus may include a radiation detector.

It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

It will also be understood that the term 'detector data' refers to data that has originated from a detector, whether processed subsequently by associated or other electronics within or outside the detector.

The invention is applicable to a wide range of implementations using a variety of detector types and detector output data formats, which enable a range of outputs to be produced. For example, in one embodiment, the detector output data may be generated by an X-ray cargo screening apparatus comprising multiple LYSO detectors, and the resolution of individual signals enables the generation of a 3-dimensional X-ray attenuation image of the object passing through the screening apparatus. In another embodiment, the detector output data may be generated by an energy dispersive spectroscopy detector in a scanning electron microscope, and the resolution of individual signals enables the allocation of each X-ray pulse measured in the detector to an energy bin in a spectral histogram, which may then undergo further software processing to determine the quantitative composition of the sample material.

Key metrics that are significant in the industries for which this invention is applicable include:
- the input count rate (ICR) which can be handled by the technology;
- the throughput of the technology (i.e. the relationship between the number of counts in compared to the number of counts out);
- the best energy resolution achievable by the technology (at a low count
- the degradation of the energy resolution with increasing count rate;
- the best energy resolution that can be achieved at very high output count rates;
- the stability of the peak position and peak resolution with count rate;
- the stability of the peak position and peak resolution with time;
- the detection of low energy pulses;
- the dynamic range (i.e. detecting both low energy and high energy events); and
- the technology's ability to handle pulse shape variability.

It will be appreciated that various implementations of the present invention address one or more of these metrics by providing inventive improvements over prior art signal processing methods.

Throughout this specification (including any claims which follow), unless the context requires otherwise, the word 'comprise', and variations such as 'comprises' and 'comprising', will be understood to imply the inclusion of a stated integer or step or group of integers or steps but not the exclusion of any other integer or step or group of integers or steps.

BRIEF DESCRIPTION OF THE DRAWINGS

In order that the invention may be more clearly ascertained, preferred embodiments will now be described, by way of exemplary implementations, with reference to the accompanying drawing, in which.

DETAILED DESCRIPTION OF THE PREFERRED EMBODIMENT

Figure 1:
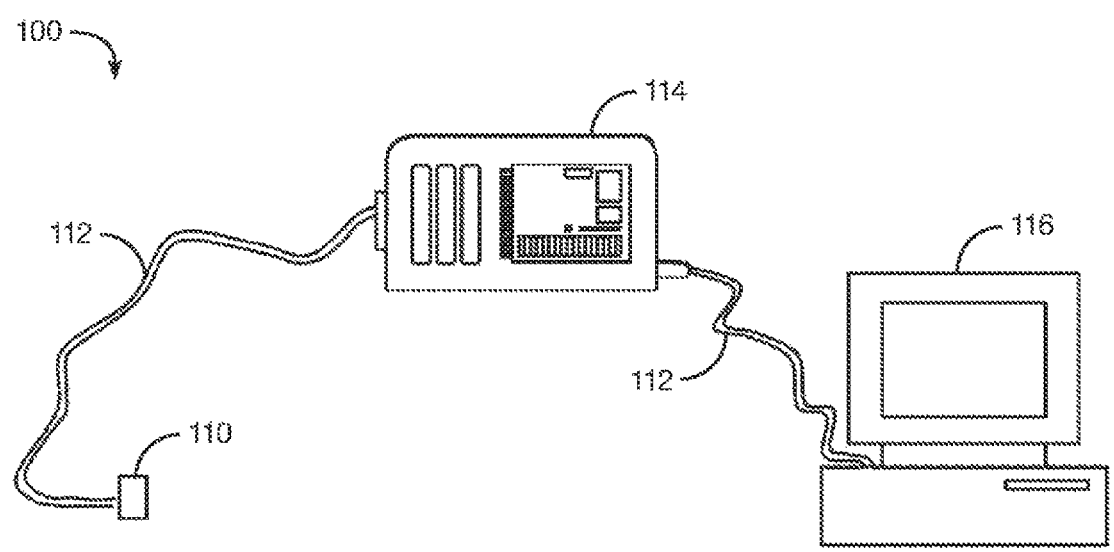
FIG. 1 depicts an exemplary spectroscopic apparatus adapted to perform pulse pile-up recovery according to one embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are disclosed so that this disclosure will be thorough and complete and will fully convey the concept of the invention to those skilled in the art, and the invention will only be defined by the appended claims. Like reference numerals refer to like elements throughout the specification.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the invention is not limited to the illustrated sizes and thicknesses.

Medical diagnostic and treatment methods relying on accurate detection and measurement of radiation, vibration or other types of energy include flow cytometry, hematology, tumor immunology and chemotherapy, prenatal diagnosis, genetics, diagnosis of leukemia, gene sequencing and bone densitometry. In particular, SPECT (Single-photon emission computed tomography), PET (positron emission tomography), and CT X-ray (computed tomography X-ray) scanning allow advanced medical imaging.

Spectroscopy may be used to analyze materials. Knowledge about the material is obtained by analysis of radiation emission or absorption from elements within the specimen. This emission of radiation can be stimulated emission due to some form of incident radiation or the result of natural emission from the constituent elements.

Two stimulated emission spectroscopy techniques are X-ray fluorescence (XRF) and Particle-induced X-ray emission (PIXE). These examples are used in the analysis of materials in the ICT and minerals exploration and processing industries. In these techniques, knowledge of the material is obtained by detection and analysis of secondary (or fluorescent) X-rays emitted from the material after that material has been energized by stimulation with high-energy photons or particles.

Gamma-ray spectroscopy, for example, is a form of spectroscopy in which the emitted electromagnetic radiation is in the form of gamma rays. In gamma ray spectroscopy the detection of the resulting radiation may be performed with a scintillation crystal (such as thallium-activated sodium iodide, NaI(Tl)), though there are a number of other detector types that can also be used. NaI(Tl) crystals generate ultraviolet photons pursuant to incident gamma-ray radiation. These photons may then be directed to a photomultiplier tube (PMT) which generates a corresponding electrical signal or pulse. As a result, the interaction between the photons and the detector gives rise to pulse-like signals, the shape of which is determined by the incident gamma-ray radiation, the detecting crystal and the PMT. The fundamental form of these pulse-like signals is referred to as the impulse response of the detector.

The output from the photomultiplier is an electrical signal representing the summation of input signals, of determined form, generated in response to discrete gamma rays arriving at the scintillation crystal. By examining the detector output over time and in particular the amplitude of the component signals, it is possible to deduce information regarding the chemical composition of the material.

Analysis by all of the above methods requires the characterization of the individual signals generated in response to incident radiation, vibration, or other forms of energy. Signal parameters of particular interest include signal amplitude, number and time of occurrence or temporal position (whether measured as time of arrival, time of maximum or otherwise). If the arrival times of two detected incident events vary by more than the response time of the detector, analysis of the detector output is relatively straightforward. However, in many applications as high flux of incident events cannot be avoided, or may be desirable so that analysis can be performed in a reasonable time period. As the time between the arrivals decreases, characterization of all resultant signals becomes difficult.

In particular, signal analysis is affected by a phenomenon known as pulse pile-up [G. F. Knoll, *Radiation Detection and Measurement,* 3rd edition, Chapter 17, pp. 632-634, 658 and 659, John Wiley and Sons, New York 2000], whereby multiple detected incident events arriving more or less simultaneously within the temporal resolving time of the detector produce signals which sum together and may be counted as a single signal. The detector does not have sufficient time to recover from the first detection (i.e. for the signal to return to the baseline) to accurately detect subsequent events.

The energy of an incident gamma ray or X-ray is reflected in the amplitude of the pulse-like signal produced by the detector. The presence of specific energies within the detector signal is indicative of particular elements in the material from which gamma rays or X-rays have arrived. Thus, a failure to differentiate a large amplitude signal caused by a single scintillation event from the superposition of multiple events can have a serious effect on the accuracy of subsequent spectroscopic analysis.

Analog pulse shaping circuitry (i.e. pulse shaping amplifiers, delay line circuits and discriminators) may be used to analyze the output of radiation detectors. However, the use of direct digitization of the detector output followed by digital pulse analysis techniques may be desirable. In the design and implementation of optimal filtering techniques for digital pulse processing, the approach for dealing with pulse pile-up in the output of radiation detectors may be consistent for both digital and analogue systems.

Certain pulse shaping electronics may reduce the response time of the detector resulting in a diminished prevalence of pile-up in the final spectrum [A. Pullia, A. Geraci and G. Ripamonti, *Quasioptimum γ and X-Ray Spectroscopy Based on Real-Time Digital Techniques*, Nucl. Inst. and Meth. A 439 (2000) 378-384]. This technique is typically limited, however, by detector response time.

Another approach is 'pulse pile-up rejection', which uses fast digital filters and logic circuits to detect piled-up events and discard the corrupted data. Signals free from pulse pile-up are used in analysis. However, as the rate of radiation incident on the detector increases, so too does the likelihood that pulse pile-up will occur and the more it is necessary to discard data. Accordingly, pulse pile-up rejection is of limited usefulness since a state is quickly reached beyond which a higher incident radiation flux ceases to reduce the time needed for spectroscopic analysis, as an increasing percentage of data must be rejected. In many applications as much as 80% of information can be lost to the effects of dead time and pulse pile-up [D. M. Scates and J. K. Hartwell, Appl. Radiat. Isot. 63,465-473 (2005)].

A more sophisticated approach is to make use of knowledge about the profile of a single pulse from the detector or to model mathematically the parameters of a signal. It is then possible in principle to distinguish signals or pulses that originate from a single event from those caused by pulse pile-up. In one such method of analysis [R. J. Komar and H.-B. Mak, *Digital signal processing for BGO detectors*, Nucl. Inst. and Meth. A336 (1993) 246-252], signals that depart from the simple profile are selected for subsequent analysis. This analysis involves fitting, via an iterative process, two pulses of varying separation and amplitude. Once the fit has been determined, the characteristics of the individual pulses are known from the fitting parameters and hence a pulse arising horn two closely occurring signals can be decomposed into the corresponding discrete signals. However, this approach fails to accommodate circumstances where pulse pile-up is caused by the superposition of more than two signals. The iterative optimization is computationally expensive and the time taken to carry out this procedure renders it impractical in most situations.

Pulse pile-up is also a problem in seismic data collection; Naoki Saito (in *Super resolution of Noisy Band-Limited Data by Data Adaptive Regularization and its Application to Seismic Trace Inversion*, CH2847-2/90/0000-123, 1990) relates to resolving closely placed spikes in a seismic trace. This technique may employ data adaptive regularization to recover missing frequency information in the presence of noise and, through repeated iteration, obtain improved resolution. However, this approach is computationally intensive.

There is interest in implementing more complex signal-processing methodologies to further improve detector resolution, timing and throughput at high-count rates [R. Novak and M. Venclj, IEEE, Trans. Nucl. Sci. 56(6), 3680-3687 (2009)]. However, the performance of more advanced "optimal" digital pulse processing techniques highly depends on the underlying assumptions of such techniques [S. Riboldi, R. Abbiati, A. Geraci and E. Gatti, IEEE Trans. Nucl. Sci. 52(4), 954-958 (2005)].

Methods that require large computational effort may limit maximum throughput, and present challenges for practical implementation of processing technology in certain environments.

FIG. 1 depicts an exemplary spectroscopic apparatus adapted to perform, pulse pile-up recovery according to one embodiment of the invention. In FIG. 1, there is provided a spectroscopy apparatus adapted to perform pulse pile-up recovery according to one example embodiment of the present invention. Spectroscopy apparatus 100 includes a detector 110, in the form of a silicon drift diode (SDD) detector of a type used for the detection and measurement of X-rays in energy dispersive X-ray spectrometry, a signal processing unit 114, a computer 116 for display and cables 112 for coupling the output of signal processing unit 114 to computer 116.

Figure 2:
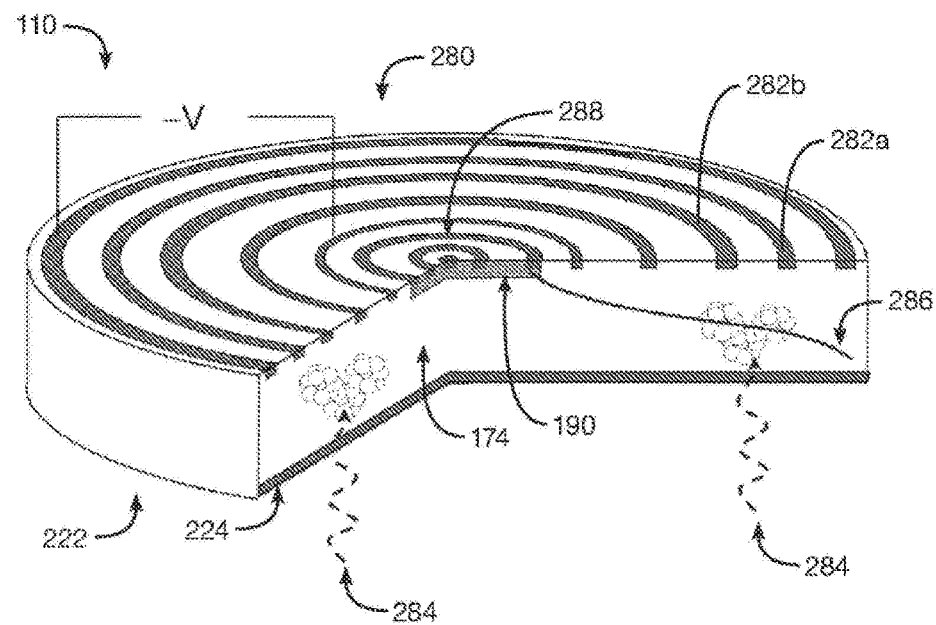
FIG. 2 is a schematic, cut-away view of the silicon drift diode (SDD) detector of FIG. 1.

FIG. 2 is a schematic, cut-away view of the silicon drift diode (SDD) detector 110 of FIG. 1. Detector 110 is constructed of high resistivity, high purity n-type silicon 174, which is of the order of 450 µm in depth and has an active surface area of 10 to 150 mm2. The active area of the incident face 222 of detector 110 (viz, the window side, on which X-ray radiation is normally incident in use) is covered by a thin junction 224 of homogenous p-type silicon. The rear side 280 of detector 110 (viz, the device side) has p-type concentric drift ring electrodes 282a, 282b with integrated voltage dividers (not shown).

A transverse electrical potential field is created across the thickness of detector 110 by a structure of evenly spaced electrodes on its front and back surfaces. Furthermore a strong radial collection field is created by the patterning of concentric ring electrodes 282a, 282b. These electrodes create both a radial and transverse electrical field to produce a 'collection channel'.

X-rays 284 impinging upon and interacting within detector 110 produce electron-hole pairs; the number of pairs created is proportional to the energy of the incident X-ray. The free electrons drift through detector 110 along a collection channel 286 defined by the electric potential field within detector 110, and are collected at a central, electron-collecting anode 288. The electric charge, collected on the central anode 288 is amplified, in a first stage amplification process, by a field effect transistor (FET) 190, integrated into the detector 110. The signal outputted by anode 288 is then amplified and shaped by a signal processing Unit 114 as digitized detector output data (see FIG. 3).

A desirable benefit of the structure of silicon drift diode detector 110 is the low capacitance of anode 288, resulting in low electronic noise. This enables better energy resolution and higher counting rates than some other X-ray detectors, such as Si—PIN photodiodes or Si(Li) crystals.

Figure 3:
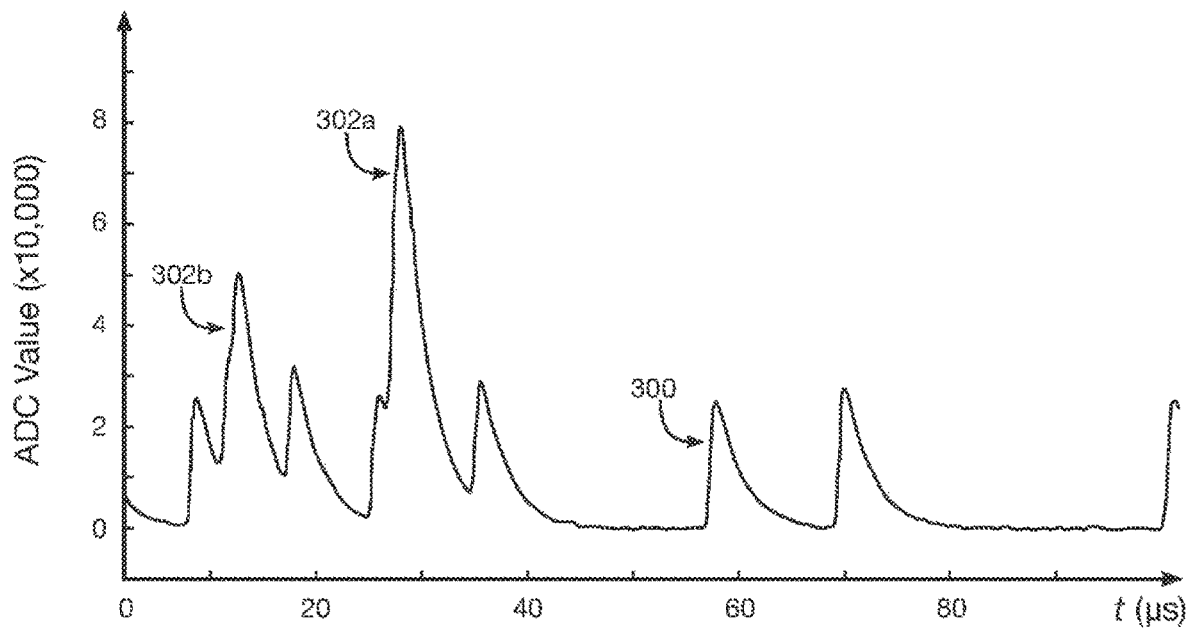
FIG. 3 is a graph illustrating approximately 100 µs of exemplary data outputted from a silicon drift diode detector of the type shown in FIG. 2.

FIG. 3 is a graph illustrating approximately 100 µs is of exemplary data outputted from a silicon drift diode detector of the type shown in FIG. 2. The charge collected on anode 188 was amplified and shaped by pulse shaping and amplifying electronics, as discussed above; FIG. 3 depicts the resulting signal. The signal shape that results horn detection of a single X-ray is evident in this digitized detector output at 300. However, there are circumstances in which multiple X-ray events will interact with the detector in quick succession. In such circumstances, evident at 302a, 302b, detector 110 does not recover from one event (i.e. the signal does not return to baseline) before the next event occurs, leading to pulse pile-up. It will be seen, therefore, that spectroscopy apparatus 100 is susceptible to pulse pile-up, so signal-processing unit 114 is employed as described above to determine the location and amplitude of pulses in the output of detector 110.

In some exemplary implementations, the spectroscopy apparatus takes a number of different forms depending on the implementation, for example, a metal detector, a landmine detector, an imaging apparatus (such as a medical imaging apparatus), a mineral detection apparatus, an oil well logging apparatus, an unexploded ordnance detector, a cargo screening apparatus, a baggage screening apparatus, an X-ray fluorescence apparatus, an X-ray diffraction apparatus, an X-ray absorption spectroscopy apparatus, an X-ray backscatter apparatus, a small angle neutron scattering apparatus, a powder diffractometer apparatus, a neutron reflectometer apparatus, an oil exploration apparatus, a scanning electron microscope apparatus, a semiconductor radiation detector (such as a silicon drift detector apparatus, Cadmium Zinc Telluride detector apparatus, or a High Purity Germanium (HPGe) detector apparatus), a vibration detector such as a seismic reflection apparatus, a radio detection and ranging (RADAR) apparatus, a sound navigation and ranging (SONAR) apparatus, an elemental detection and measurement apparatus, a radiation safety detection apparatus, a biological assay apparatus (such as a Flow Cyclometry apparatus or a Radioimmunoassay) or a superconducting apparatus such as a superconducting tunnel junction apparatus or a superconducting calorimeter).

Figure 4:
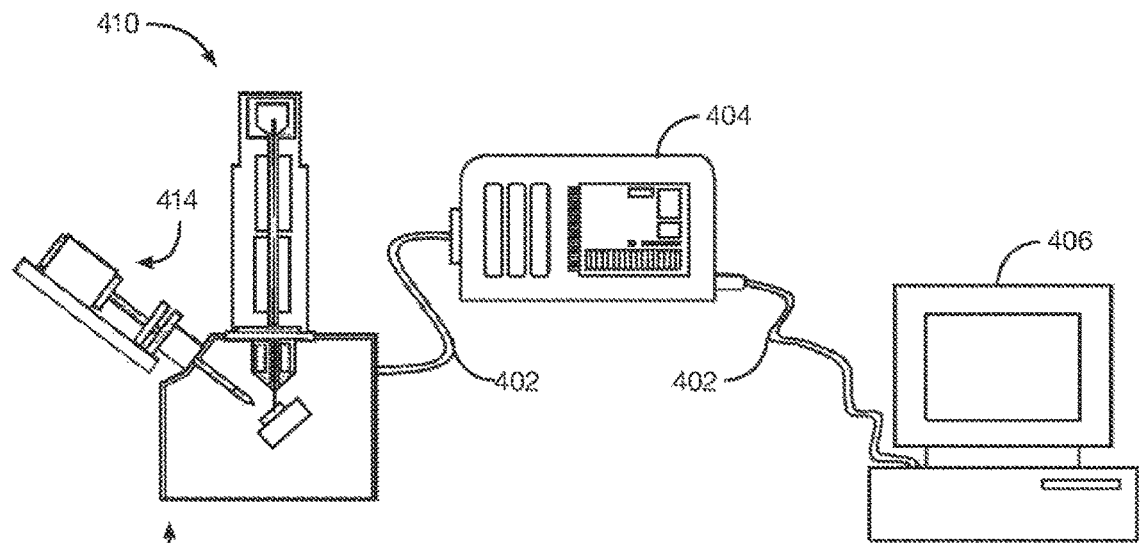
FIG. 4 depicts an exemplary X-ray microanalysis apparatus adapted to perform pulse pile-up recovery according to another embodiment of the present invention.

According to one embodiment of the present invention, FIG. 4 depicts an exemplary X-ray microanalysis apparatus adapted to perform pulse pile-up recovery according to another embodiment of the present invention, shown schematically at 410, X-ray microanalysis apparatus 410 includes a detector in the form of an electron microscope 412 (with attached Energy Dispersive Spectrometry (EDS) system 414), a signal processing unit 404 (comparable to that of FIG. 1), a computer 406 for display and cables 402 for coupling the output of signal processing unit 404 to computer 406. Signal processing unit 404 determines the location and amplitude of pulses in the output of electron microscope 412, as described above.

Figure 5:
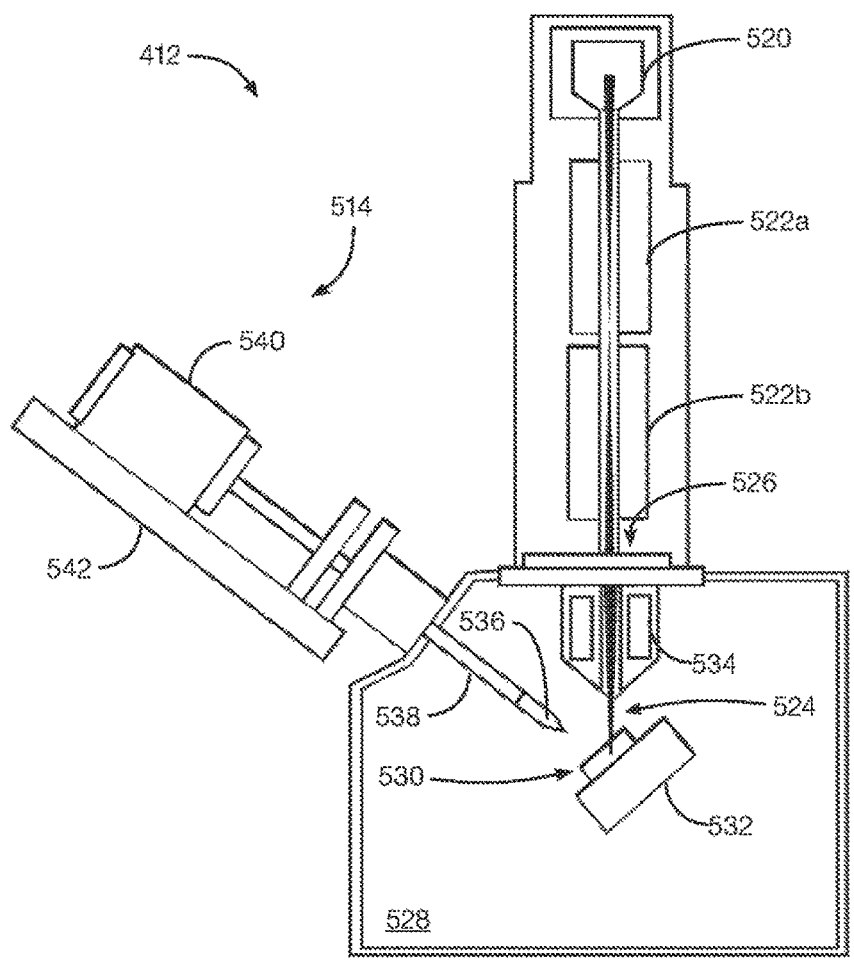
FIG. 5 is a schematic view of an electron microscope with attached EDS system that can be used in the X-ray microanalysis apparatus of FIG. 4.

FIG. 5 is a schematic view of an exemplary electron microscope 412 with an attached EDS system 514 that can be used in the X-ray microanalysis apparatus of FIG. 4. An electron gun 520 may produce a beam of electrons, which is focused by a pair of successive condenser lenses 522a, 522b. The resulting focused beam of electrons 524 passes through an aperture 526 into a vacuum chamber 528 of the electron microscope, which electron beam 524 impinges upon a specimen 530 mounted on a stage 532 within chamber 528. The focused electron beam 524 may be scanned across specimen 530 using scanning coils 584.

When electron beam 524 impinges upon specimen 530, electrons are ejected from specimen 530, leading to a cascade of electrons from higher to lower energy orbital and the emission of X-rays. These X-rays have wavelengths unique to the elements making up specimen 530, so they may be used to characterize those elements.

The analysis of the emitted X-rays commences with EDS system 514, which is mounted to the outside of electron microscope 412. EDS system 514 comprises a silicon drift diode (SDD) detector 536, attached to the end of a cold finger 538. Cold finger 538 is used to cool the surface of detector 536 to −25° C. in some implementations. The output signal from SDD detector 536 is amplified and processed by pulse shaping electronics (not shown) housed in the body 540 of EDS system 514. Ultimately the energy of the fluorescent X-rays is determined by signal processing unit 404. EDS system 514 is mounted on an automated variable movement stage 542 to enable automated control over the distance between SDD detector 536 and specimen 530.

FIG. 3 depicts the digital time series formed from X-rays emitted from the EDS system 514 and captured by the silicon drift diode (SDD) detector 536. The area under the individual pulses 300 defines the energy deposited on the detector by the emitted X-rays.

Figure 6:
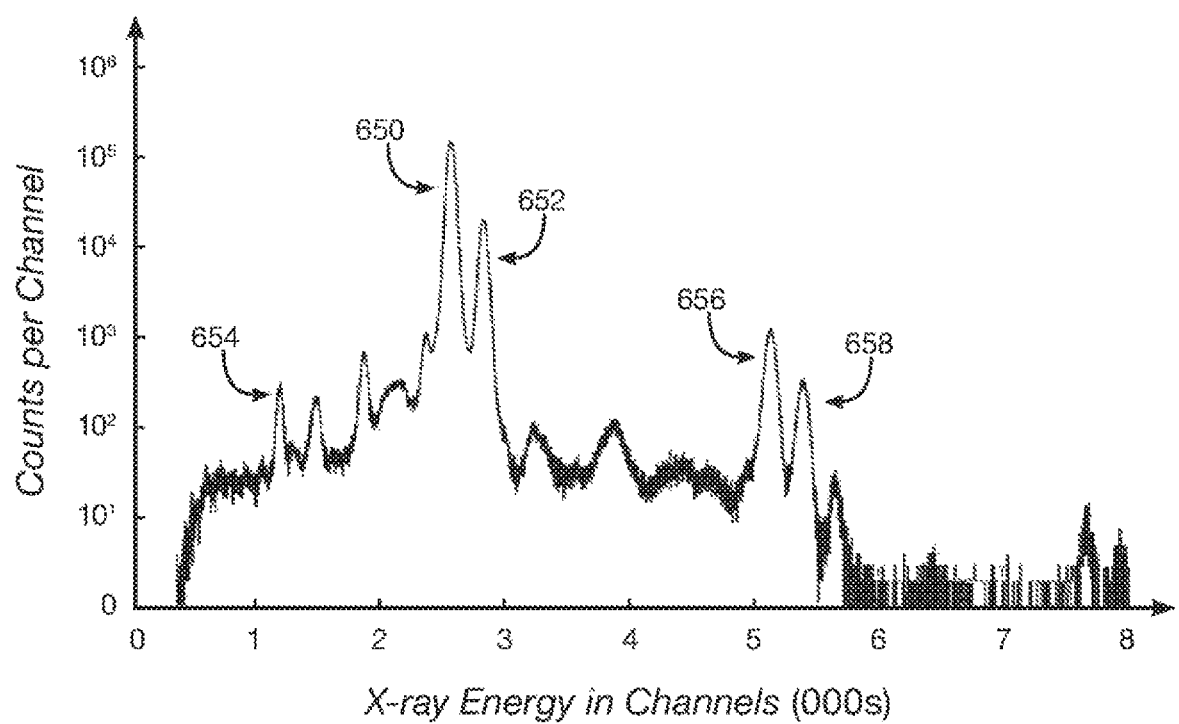
FIG. 6 depicts an exemplary X-ray energy spectrum, collected using as SDD detector configured to measure fluorescent X-rays emitted from a sample.

FIG. 6 depicts an exemplary X-ray energy spectrum, collected using a SDD detector (cf. FIGS. 2, 4 and 5) configured to measure fluorescent X-rays emitted from a sample. An X-ray tube may stimulate the emission of fluorescent X-ray. The relative energy of the fluorescent X-rays is indicated along the X-axis; the total number of energy channels in this spectrum is 8,192 channels. The Y-axis indicates on a logarithmic scale the number of signals recorded at each energy channel.

The spectrum of FIG. 6 represents a total data collection of 60 seconds; the input count rate (ICR) of the SDD detector (the number of events interacting with the detector each second) was approximately 153,200 events per second. The output count rate (OCR) of the SDD detector (the number of events coming out of the EDS system each second) was approximately 131,700 events per second; the system dead time (the difference between the ICR and the OCR) was 14%. The energy resolution of this X-ray spectrum, defined as the full width of the main peak at half its maximum value (FWHM), was 159 electron volts (eV) or 2.48%.

The most common fluorescence X-ray from naturally occurring iron (which is predominantly 55Fe) has energy of 6.40 keV. In the energy spectrum of FIG. 6, this X-ray emission peak is shown at 650, at approximately channel 2,550. Another fluorescence X-ray known to be characteristic of 55Fe is the emission peak at 7.06 keV, visible at 652 in the X-ray energy spectrum of FIG. 6. Less common X-ray fluorescence from other elements in the sample (or surrounding air) can also be seen in the energy spectrum at 654.

Two additional, distinct peaks are visible (at 656 and 658) between channels 5,000 and 5,500. These peaks are not due to high-energy fluorescence X-rays but rather to the superposition of signals from the lower energy characteristic peaks of 55Fe, the 6.40 keV and 7.06 keV (at 650 and 652) respectively. The superposition of these peaks, owing to pulse pile-up, occurs in the Output of the SDD detector when radiation events arrive at the detector in such quick succession that the detector cannot adequately recover from the first event (the detector output signal does not return to baseline) before the arrival of subsequent signal.

Pulse pile-up in the digitized output of a SDD detector causes pile-up peaks in the X-ray energy spectrum these peaks can interfere with accurate material characterization as they may mask spectral peaks from other fluorescence X-rays originating in the sample. Hence, signal-processing unit 114 is employed as described above to determine the location and amplitude of pulses in the output of the SDD detector.

The approach of the present invention may be applied in many other fields. In some implementations, pulse pile-up is a problem in seismic data processing. Some approaches are computationally intensive (even if producing good results); the method of the present invention can be applied to the processing of seismic data without excessive computational overhead such that a relatively fast and inexpensive alternative approach is provided, even if in some applications the results are not as good as are provided by sonic techniques.

In another embodiment of the invention, a reflection seismology system is used to employ sonic energy to perform subsurface exploration for oil as a non-limiting example, Sonic reflection, or reflection seismology, is a technique for geophysical exploration using the principles of seismology to determine the properties of the subsurface environment. Reflection seismology is conducted by initiating seismic waves into the Earth's subsurface at an initiation point using an explosion, vibrators or specially designed an gun. The seismic waves thus generated are a type of elastic wave that is conducted through the Earth. Different types of subsurface material, such as granite, shale, gas or oil, have different acoustic impedances so, when the initiated seismic waves encounter a boundary between materials (i.e., between materials and with different acoustic impedances), some of the wave energy will be transmitted through the boundary and a portion of the wave energy will be reflected off the boundary. The amplitude of the reflected wave depends on the magnitude of the wave coming into the boundary, the angle at which the wave intersects the boundary and the impedance contrast between the two materials.

The portion of the seismic wave that is reflected back from boundary to the Earth's surface is detected by a seismometer array. Seismometer array comprises a plurality of individual geophones that convert ground motion, induced by the reflected seismic waves, into electrical signals. In use, geophones are coupled into the Earth's surface, and connected together with cables. The electrical signals output by the geophones are then recorded at a recording station for further analysis and processing. Recording station includes a pulse processing board comparable to pulse processing board 114 of FIG. 1, adapted to receive and process the electrical signals output by geophones to resolve individual signals in the output of geophones.

It should be noted that, in some applications of this technique, there might be as single detonation point with multiple sonic detectors for the recording of the reflected seismic waveforms. In other applications multiple detonation sites may be used in conjunction with a multitude of sonic detection, sites to determine a more robust model of the sub surface environment.

A comparable system according to another embodiment of the present invention may be used for conducting exploration surveys in ocean environments. In this embodiment, the system comprises a ship towing an array of pneumatic air guns as an excitation source. These guns emit low frequency sound pulses (up to 300 Hz and 250 dB) into the ocean to stimulate seismic waves in the seabed below. The system also includes multiple seismic cables for detecting the reflected seismic waves; the cables—which are typically deployed in parallel—are, in this embodiment, at least 6 kilometers in length and spaced 150 meters apart, and provided with hydrophones at regular intervals along each cable to record the sound signals reflected off features beneath the seabed. The system, according to this embodiment, includes a pulse processing board (on the ship) comparable to pulse processing board (114) of FIG. 1 for receiving and processing the output of the hydrophones in order to resolve individual signals in the output of those hydrophones.

Reflection seismology is the primary form of exploration for hydrocarbons in both the land and ocean environments and may be used to find other resources including coal, ores, minerals and geothermal energy. For more detection of shallow subsurface features, up to a few tens of meters in depth, electromagnetic waves can be used instead of elastic waves, a technique referred to as ground penetrating radar. All such systems can, according to other embodiments of the present invention, include a pulse processing board comparable to pulse processing board 114 of FIG. 1 for processing the output of the sonic or radar detectors in order to resolve individual signals in the output of those respective detectors.

The method of the present invention may also be employed in many material or product analysis fields. In some implementations, semiconductor processing and fabrication employs high-resolution measurement devices and techniques for evaluating parameters of samples: various measurements are performed in which thin films—such as oxides, metals or dielectrics—are deposited on semiconductor substrates of for example, silicon. Non-destructive techniques are particularly useful for evaluating thickness, identifying impurities and determining the index of refraction of the films to ensure high yields during fabrication. One type of data that is particularly useful in semiconductor fabrication is that relating to the dose and profile of ion implantation of dopants such as arsenic, phosphorus and boron this data may be obtained, with X-ray fluorescence measurements performed at varying small angles, and collected using an energy-dispersive solid-state detector such as a Si(Li) detector. The method of the present invention may be used to process the output of such a detector in this field.

In automated deoxyribonucleic acid (DNA) sequencing, the problem of pulse pile-up (and hence dead-time) may be avoided by ensuring that only one nucleotide is present in a detection region at any given time. However, the need to do so should be substantially reduced—permitting greatly faster data collection—by the use of the method of the present invention.

Similarly, the widespread use of miniaturized electronic circuits creates the need for sophisticated analytical techniques capable of high-resolution measurement. In some implementations, photoluminescence lifetime spectroscopy is used to measure photoluminescence in semi-conductors, especially those of compounds such as gallium arsenide that are susceptible to the incidence of structural discontinuities due to local crystallization defects. In some other implementation, such defects are detected as variations in photo luminescent output, measured with single photon avalanche diode (SPAD) detectors. The output of such, detectors is processed to allow the measurement of the photo luminescent lifetime delay characteristics of the sample under inspection. In some implementations, the rapid decay of photoluminescence in GaAs substrates allows the use of high repetition rate pulsed laser sources, theoretically permitting a data collection rate of 500,000 counts per second. In practice, pulse pile-up limits the maximum data collection rate in such applications to around 100,000 counts per second due to the finite conversion dead time of even faster commercially available time-to amplitude convener. The method of the present invention, employed to process the data from such detectors, will allow significantly higher data collection rates in these applications.

The person skilled in the art will readily appreciate that the radiation detector arrangement described above is merely an exemplary embodiment. The present invention may be similarly applied, to any detector system for radiation, vibration or other types of energy for example as described herein.

In some implementations, other varied arrangements for which the present invention is applicable, but is not limited to, include:

1) Detection of radiation with a number of other types of organic or inorganic scintillators for example, but not limited to, barium fluoride ($BaF_2$), calcium fluoride ($CaF_2$), bismuth germanate (BGO), cadmium tungstate ($CdWO_4$), caesium iodide CsI, or doped with thallium CsI(Tl), doped with sodium CsI(Na). Gadolinium oxysulfide ($Gd_2O_2S$), lanthanum bromide ($LaBr_3$), lanthanum chloride ($LaCl_3$), lead tungstate ($PbWO_4$), lutetium iodide ($LuI_3$), lutetium oxyorthosilicate (LSO), sodium iodide doped with thallium NaI(Tl), yttrium aluminium garnet (YAG), zinc sulphide (ZnS), zinc tungstate (ZnWO4).

2) Detection of radiation with solid state (semiconductor) detectors that rely on detection of the charge carriers (electrons and holes) generated in semiconductors by energy deposited by gamma-ray photons. For example, detectors made of lithium-doped silicon and germanium, cadmium telluride or cadmium zinc telluride.

3) Electron detection in scanning electron microscopy (SEM). Two electron detector types may be used for SEM imaging: scintillator type detectors (Everhart-Thornley) are used for secondary electron imaging, in which the detector is charged with a positive voltage to attract, electrons to the detector for improved signal to noise ratio, while detectors for backscattered electrons may be a scintillator or solid-state detector.

4) Optical radiation detection in flow cytometry. In flow cytometry, detectors typically include silicon photodiodes or photomultiplier tubes (PMTs). Silicon photodiodes may be used to measure forward scatter when the optical signal is strong. PMTs are more sensitive instruments and are ideal for scatter and fluorescence readings.

Figure 7:
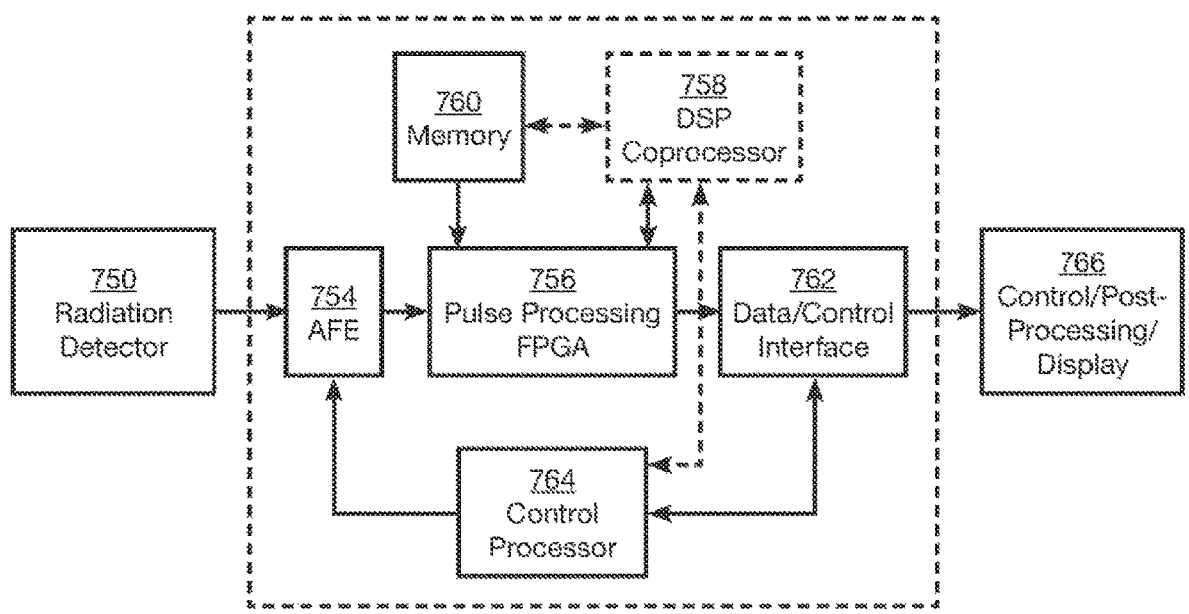
FIG. 7 is a schematic diagram of the functional elements of the spectroscopy apparatus of FIG. 1.

FIG. 7 is a schematic diagram of the functional elements of the spectroscopy apparatus of FIG. 1 and is provided to explain in more detail the signal processing method for pulse pile-up recovery employed by the apparatus of FIG. 1. Referring to FIG. 7, the radiation detector (750) is connected to a pulse processing board (752) via an analog front end (AFE) (754). The purpose of the AFE (754) is to digitize the signal produced by the radiation detector (750) by performing analog to digital conversion at in this embodiment, 125 MHz with 12-bit conversion accuracy.

Once the output of the radiation has been digitized by the AFE (754), the signal processing method for pulse pile-up recovery is implemented. The digital signal produced by the AFE (754) is passed into the pulse processing Field Programmable Gate Array (FPGA) (756). The pulse processing FPGA (756) then implements the pulse processing method of this embodiment; a digital signal processing (DSP) coprocessor (758) may be used to assist the pulse processing FPGA (756) to implement the pulse processing method. Variables required by the pulse processing FPGA (756) and data produced at interim steps of the pulse processing method are stored in memory (760). The signal processing is controlled via a Data/Control Interface (762) which, in conjunction with a Control Processor (764), may be used to modify the implementation of the signal processing. The output data from the signal processing method can be displayed on a display (766) via the Data/Control Interface (762). Display (766) is provided in a computer that may, if desired, be used to perform post-processing and system control.

Figure 8A:
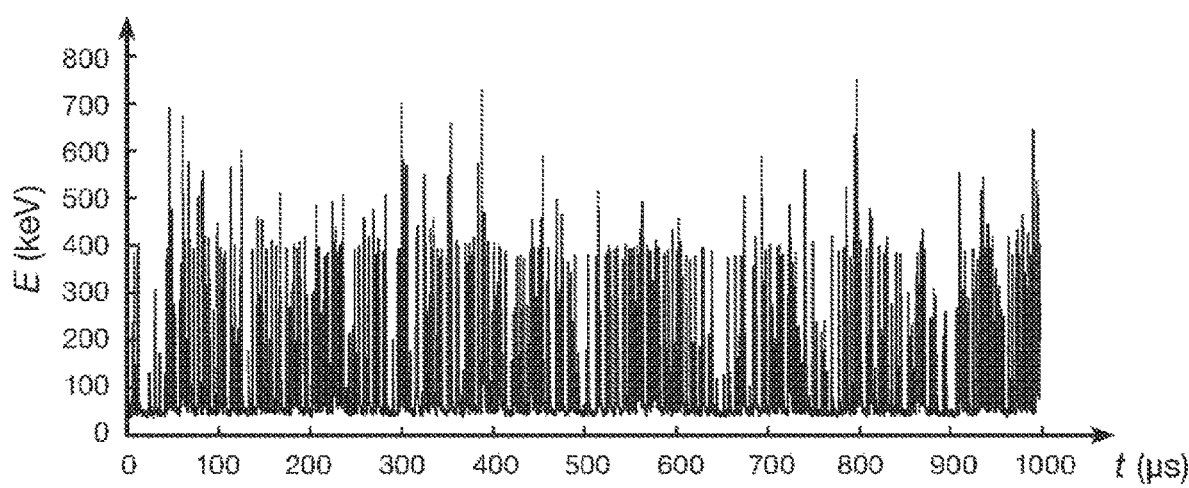
FIGS. 8a, 8b and 8c illustrate exemplary waveforms resulting from digitization of detector output data, over time ranges of 1000 microseconds, 100 microseconds and 10 microseconds respectively.
Figure 8B:
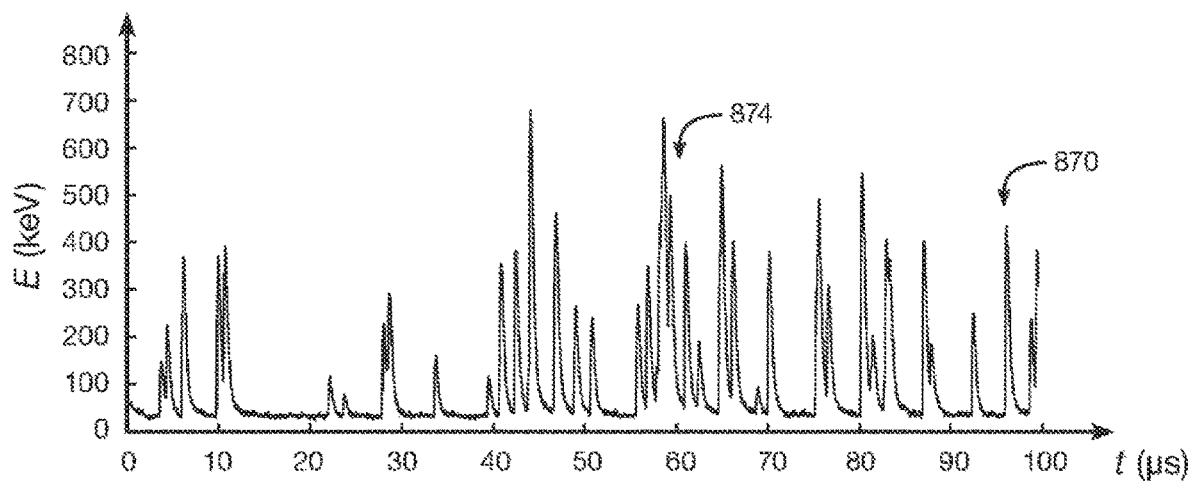
Figure 8C:
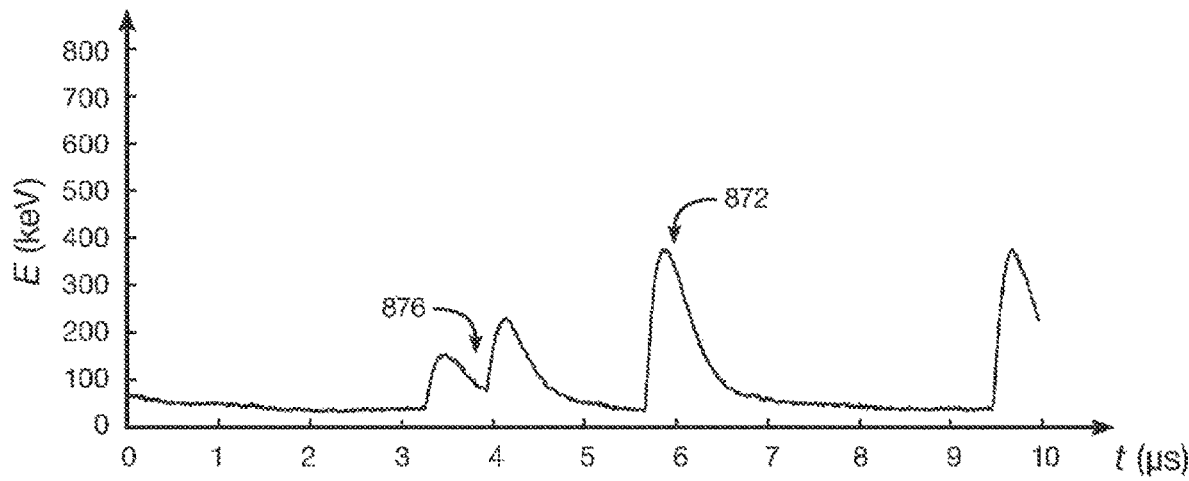

FIGS. 8a, 8b and 8c illustrate exemplary waveform resulting from digitization of detector output data, over time ranges of 1000 microseconds, 100 microseconds and 10 microseconds respectively. The various peaks in these figures correspond to the detection of respective gamma rays. Some peaks appear as discreet signals or pulses (870, 872) which may indicate the presence of only a single gamma ray. Other peaks are due to the pile-up either of two peaks (876) or of three or more peaks (874).

Figure 9A:
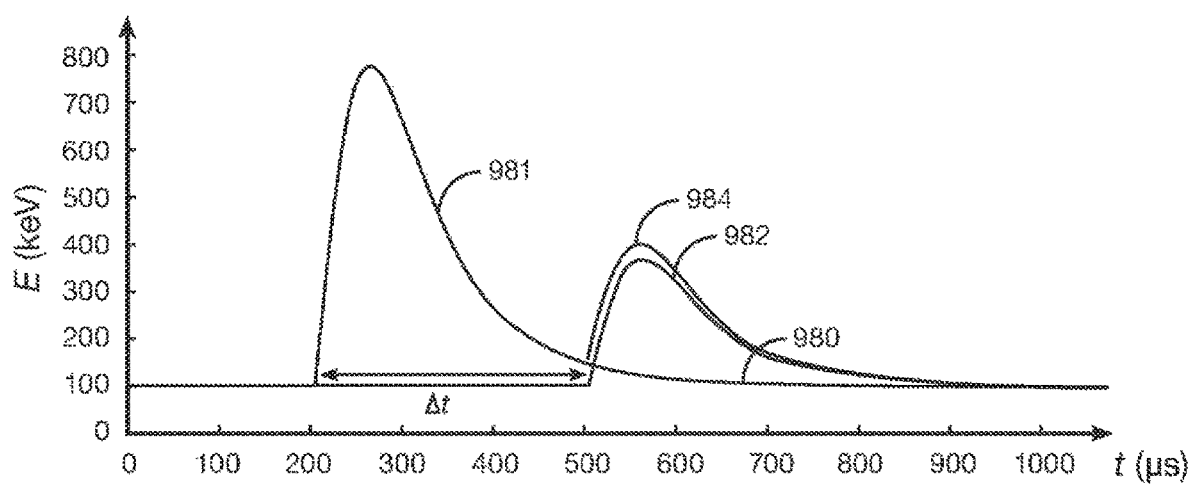
FIGS. 9a, 9b and 9c illustrate exemplary forms of pulse pile up, namely 'tail-end pile-up', 'peak pile-up', and 'multiple peak pile up' respectively.
Figure 9B:
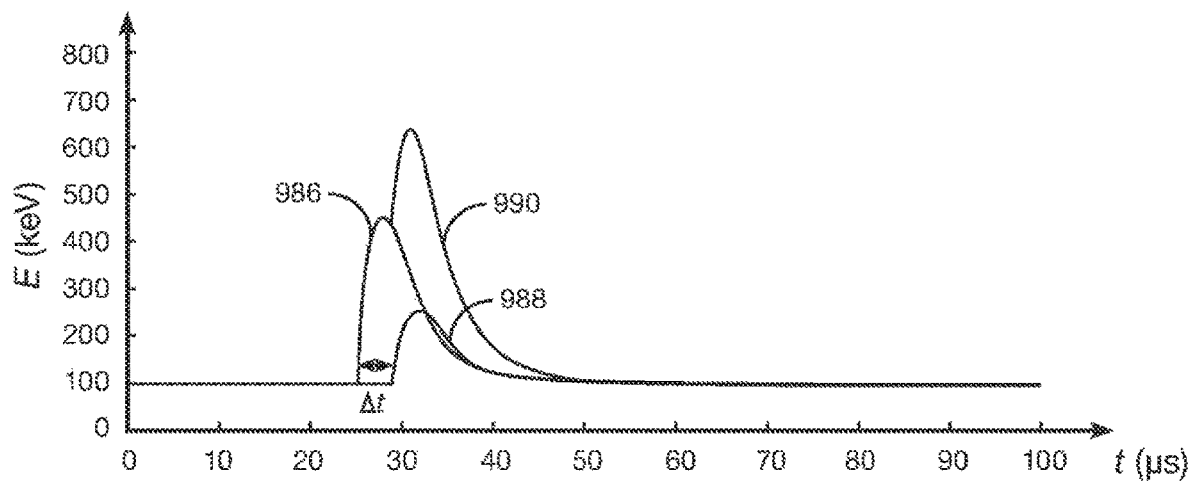
Figure 9C:
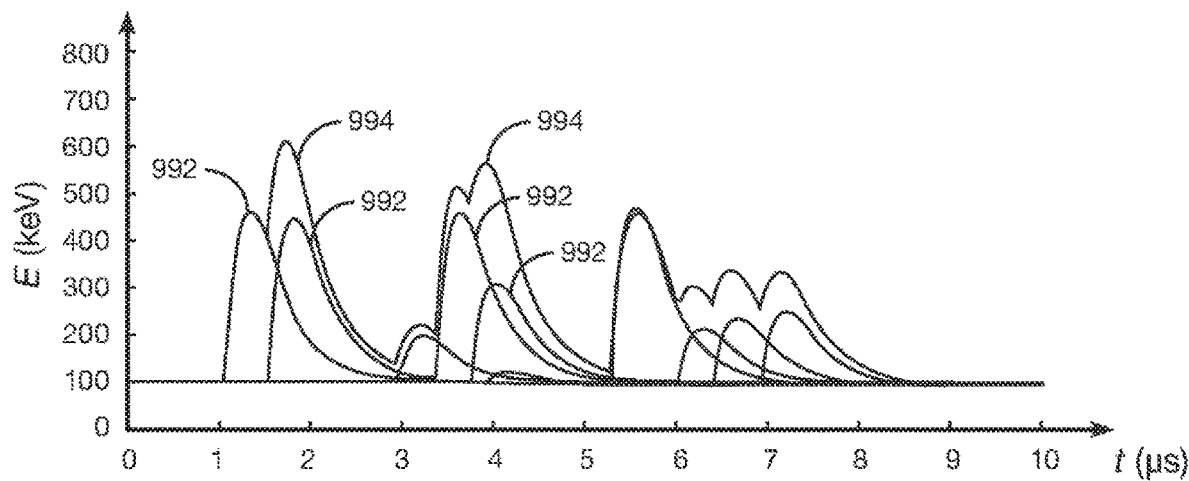

FIGS. 9a, 9b and 9c illustrate exemplary forms of pulse pile up, namely: 'tail-end pile-up', 'peak pile-up', and 'multiple peak pile up' respectively according to an exemplary embodiment of the invention. As shown in FIGS. 9a, 9b and 9c, the effect of pulse pile-up is shown by illustrative signals or pulses plotted as energy E versus time t (both in arbitrary units).

FIG. 9a illustrates so-called 'tail-end pile-up' where, depending on the type of pulse conditioning employed, the tail (980) of one pulse (981) can provide a significant positive or negative bias (positive in the illustrated embodiment) to the amplitude of a subsequent pulse (982). Although the time displacement between the two pulses, $\Delta t$, is relatively large (when compared with the overall time interval for which the pulses prevail), the signal envelope or resultant waveform (984) is significantly above zero at the arrival of the second pulse (982).

The absence of a true zero signal-state between the two pulses corrupts the analysis as the tail of the first, falsely inflates the amplitude of the second pulse. FIG. 9b illustrates the second form of pulse pile-up, 'peak pile-up'. Here two pulses (986) and (988) arrive closely spaced in time (i.e. the time displacement Δt between the pulses is small compared with the overall time interval over which the pulses prevail). The resultant output waveform (990) appears more or less as a single pulse of somewhat greater amplitude than either of the component pulses. In situations where the flux of events through the detector is extreme, it is not uncommon to have multiple events arriving within the response time of the detector leading to multiple peak pile-up. Such a case is illustrated by FIG. 9c. Multiple signals or pulses (such as those shown at 992) arrive with random time separation Δt and sum to produce a resultant waveform (994) from which the parameters of the component signals are difficult to extract.

One component of the method of addressing pulse pile-up according to this embodiment is the estimation of certain parameters of the signals or pulses; these parameters are the number, time-of-arrival and energy of all gamma rays in the detector data stream. These parameters are estimated, according to this embodiment, by modeling the signals in the data stream mathematically.

Signal Modelling

Figure 10:
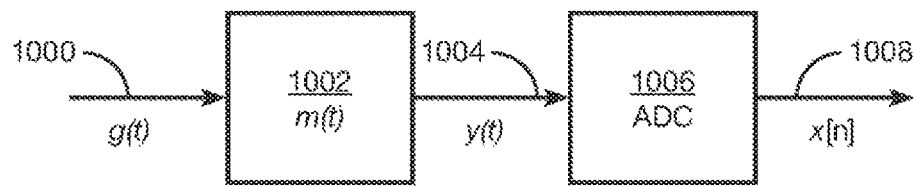
FIG. 10 illustrates exemplary modeling of the signal detection process according to one embodiment of the invention.

FIG. 10 is a diagram that illustrates exemplary modeling of the event detection process according to an exemplary embodiment of the invention. Radiation or other energy events g(t) (1000) are incident on the detector (1002) represented by the measurement process m(t), resulting in output data from the detector y(t) (1004). The addition of a sampling process (1006) produces the digital detector data or 'time-series' x[n] (1008).

Figure 11:
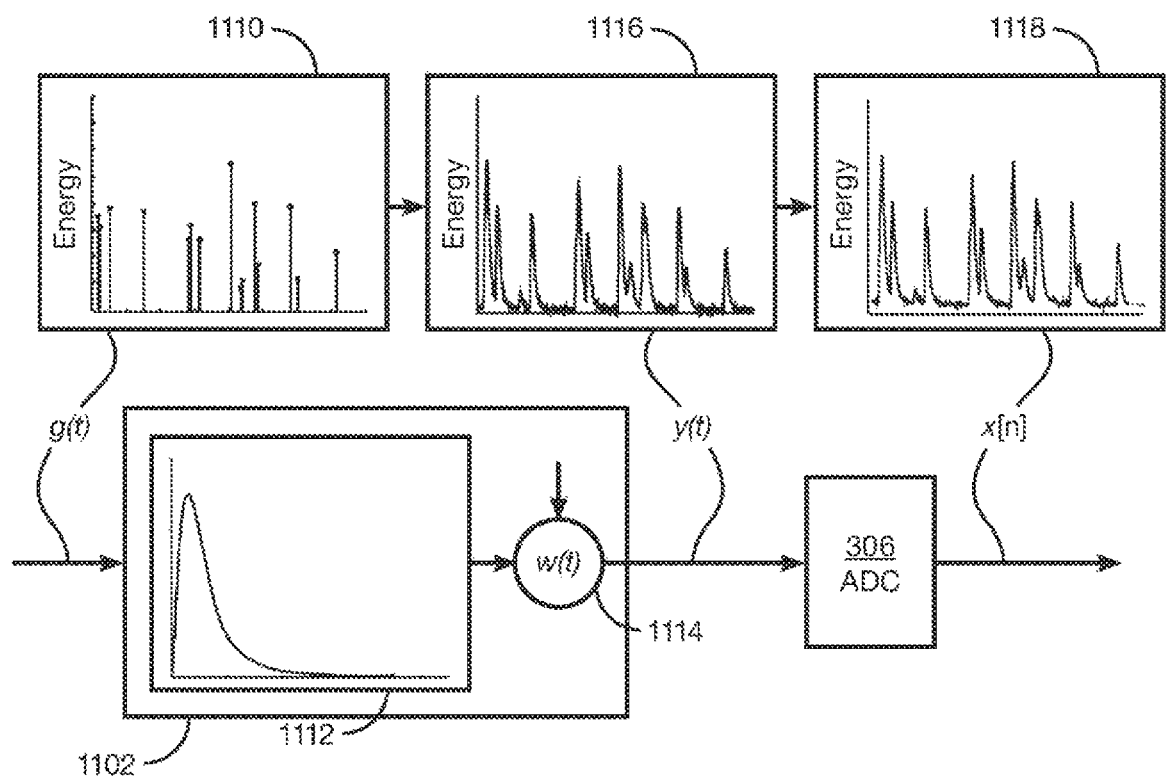
FIG. 11 illustrates a more detailed mathematical model of the energy detection process shown in FIG. 10.

It is possible to add to the above-described model some knowledge about the physical processes of energy event detection. FIG. 11 illustrates a more detailed mathematical model of the energy detection process shown in FIG. 10 according to an exemplary embodiment of the invention. The input to the detector g(t) is characterized by Equation 1, in which the input g(t) is assumed to be an unknown number (N) of delta-function-like impulses of random amplitude (α) and time of arrival (τ). An exemplary implementation of such input is shown at (1110).

$$g(t) = \sum_{i=1}^{N} \alpha_i \delta(t - \tau_i) \quad (1)$$

$$i = 1, 2, 3, \ldots, N$$

The detector is assumed to have a specific response to the incoming events, referred to as the detector impulse response d(t), which is illustrated at (1112). The digitized version of the detector impulse response is denoted d[n].

The output from the detector is shown at (1116) and characterized by Equation 2, in which the detector output y(t) is the sum of an unknown number of signals of predetermined form d(t), with unknown enemy (α) and unknown time of arrival (τ). Consideration is given to sources of random noise ω(t) (1114). The digital detector data x[n] shown in (1118) and is produced by the analog to digital converter.

$$y(t) = \sum_{i=1}^{N} \alpha_i d(t - \tau_i) + \omega(t) \quad (2)$$

$$i = 1, 2, 3, \ldots, N$$

The digitized signal x[n] at the output of the analog to digital converter (306), as illustrated at (1118), is therefore given by:

$$x[n] = \sum_{i=1}^{N} \alpha_i d(n - \Delta_i) + \omega(n), \quad (3)$$

where d[n] is the discrete time form of the predetermined form of the signal d(t), $\Delta_i$ is the delay in samples to the ith signal, and ω(n) is the discrete time form of the noise. The digitized signal x[n] may also be written in matrix form as:

$$x = A\alpha + \omega \quad (4)$$

where A is an m×N matrix, the entries of which are given by:

$$A(n, i) = \begin{cases} d(n - \Delta_i) & \Delta_i \leq n < \min(m, \Delta_i + T - 1) \\ 0 & \text{otherwise} \end{cases} \quad (5)$$

Also, T is the length of d[n] in samples, in is the total number of samples in the digitized signal x[n], α is the vector of N signal energies, and ω is the noise vector of length in Matrix A may also be depicted as follows:

$$A = \begin{bmatrix} 0 & 0 & \cdots & 0 \\ \vdots & & & \\ 0 & \vdots & & \\ d(1) & & & \vdots \\ d(2) & 0 & & \\ \vdots & d(1) & & \\ d(T) & & & \\ 0 & \vdots & \ddots & 0 \\ & & & d(1) \\ \vdots & d(T) & d(2) & \\ & & \vdots & \\ 0 & \cdots & 0 & d(r<T) \end{bmatrix} \begin{matrix} \\ \\ \\ \leftarrow \text{row } \Delta_1 \\ \\ \leftarrow \text{row } \Delta_2 \\ \\ \\ \\ \leftarrow \text{row } \Delta_N \\ \\ \\ \end{matrix} \quad (6)$$

Thus, the columns of matrix A contain multiple versions of the signal shape. For each of the individual columns, the starting point of the signal shape is defined by the signal temporal position. In some implementations, if the signals in the data arrive at positions 2, 40, 78 and 125, column 1 of matrix A will have '0' in the first row, the 1st datum point of the signal form in the second row, the 2nd datum point of the signal form in the 3rd row, etc. The second column will have '0' up to row 40 followed by the signal form. The third column will have '0' up to row 78; the fourth column will have '0' up to row 125 and then the signal form. Hence the size of matrix A is determined by the number of identified signals (which becomes the number of columns), while the number of rows depends on the number of samples in the 'time series'.

The signal processing method of this embodiment thus endeavors to provide an accurate estimate of some unknown parameters of the detector data, including not only the number of component signals (N) in the detector output but also the energy (α) and time-of-arrival (τ) of each of the component signals.

Pulse Shape Transformation

To date, pulse pileup rejection processing has involved use of the entire shape of the detector impulse response to try to estimate the individual pulse energies. As a result, the computation involved the solution of a system of matrix equations, including decomposition of a (more or less) full matrix of dimension 45×45.

The present invention avoids the computing and implementation challenges of the prior art methods by first ensuring the signal is already in, or is transformed into, a simpler form for further processing, which substantially resembles a step function, in contrast to the curved peak waveform of typical detector data. This significantly reduces the computational burden of prior art methods and enables processing of signals received at vastly higher input count rates, and once processed, output of signals with vastly higher output count rates.

Figure 12:
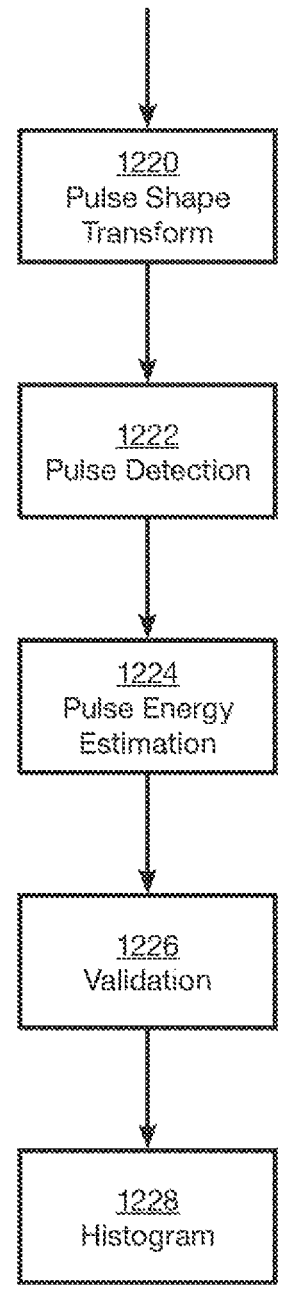
FIG. 12 depicts an exemplary process for determining a histogram illustrating parameters of the detector data using a pulse shape transform according to an embodiment.

The digital signal produced by the AFE is passed into the pulse processing Field Programmable Gate Array (FPGA) 756 which comprises a Pulse Shape Transformer. FIG. 12 depicts an exemplary process for determining a histogram illustrating parameters of the detector data using a pulse shape transform according to an embodiment. The steps illustrated in FIG. 12 may be performed by a pulse processing FPGA 756, or my other component such as by a DSP coprocessor 758 and/or a control processor 764. At block 1220, pulse processing FPGA 756 processes the detector data using a pulse shape transform to extend the pulse decay time towards infinity. At block 1222, the pulse processing FPGA 756 further processes the detector data to detect the presence of pulses. At block 1224, the pulse processing FPGA 756 estimates the energy and/or other parameters of interest of the detected pulses. At block 1226, the pulse processing FPGA 756 verities the accuracy of the estimates through a validation process described in detail below. Finally, at block 1228, the pulse processing FPGA 756 uses the validated energy estimates to construct a histogram that can be used by the user for further post-processing.

Figure 13:
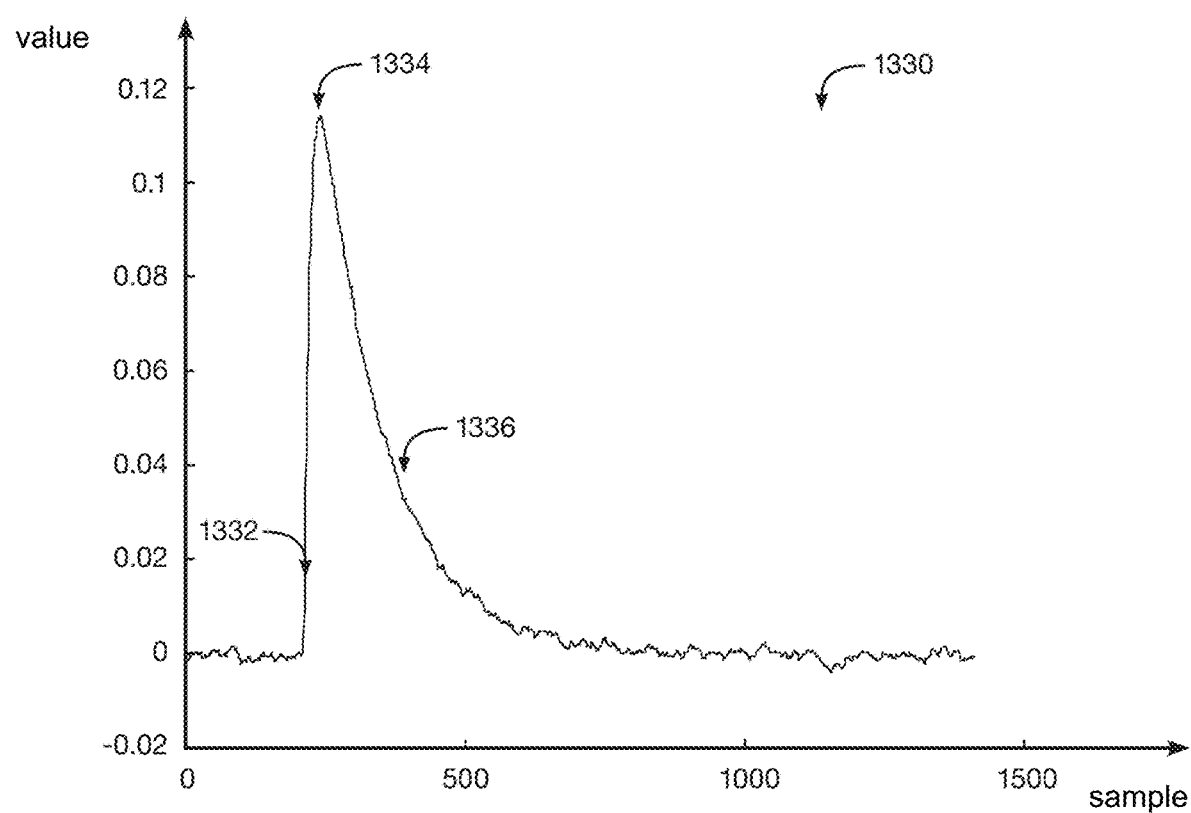
FIG. 13 depicts an exemplary pulse shape for radiation received at a detector.

FIG. 13 depicts an exemplary pulse shape for radiation received at a detector. As described previously and with reference to FIG. 13, the data stream contains pulses 1330 whose shape are typically composed of a rapid rising edge (1332), reaching a peak (1334), then a more gradual falling edge that decays back to the baseline (1336). The Pulse Shape Transformer module serves to compress the rising edge and extend the falling edge of each pulse in the time domain. Ideally, the rising edge would be compressed to become instantaneous, and the falling edge would be extended to infinity, however the characteristics of the detector pulse shape will determine how closely this ideal can be achieved.

The Pulse Shape Transformer is capable of transforming any number of a range of pulse shapes to the desired step waveform with appropriate transformational operations, for example Gaussian or single exponential pulse shapes. However, the preferred embodiment described below models signal pulses with a double exponential waveform which most closely represents the physical process of event detection in the detector, providing the most sophisticated and accurate characterization of detection events.

Implementation 1—Double Exponential:

An exemplary detector pulse shape, as shown in FIG. 13, can be modelled by a double-exponential waveform:

$$p(t)=A \cdot (e^{-at}-e^{-bt}) \quad (7)$$

Where:
p(t) is the pulse,
A is the pulse energy, and
a, b determine the falling and rising edges of the pulse shape.

For a double exponential pulse shape, the Pulse Shape Transformer performs the following manipulation on the incoming data stream:

$$y(k)=y(k-1)+x(k)-x(k-1)\cdot(e^{-a}+e^{-b})+x(k-2)\cdot e^{-a}\cdot e^{-b} \quad (8)$$

Where:
x(n) is the incoming data stream value at sample 'n'
a, b determine the falling and rising edges of the pulse shape
y(n) is the stepped data stream, which may require further scaling.

This can be implemented with a standard infinite-impulse-response (IIR) filter structure.

The use of pulse shape transformation in the past has been with the objective of reducing the incidence of pulse pile-up to improve throughput, typically by attempting to isolate each individual pulse. In contrast, the result of extending the trailing edge toward infinity as described above is that pulse pile-up is significantly increased. For a given pulse, every pulse that arrives after it will be piled-up upon its infinitely long pulse response. While this processing method would, therefore, appear to be counterproductive and non-intuitive to a person skilled in the art, this intermediary processing step enables far simpler computational analysis of the detector data in the next processing stages when it is presented in this transformed state.

Figure 14A:
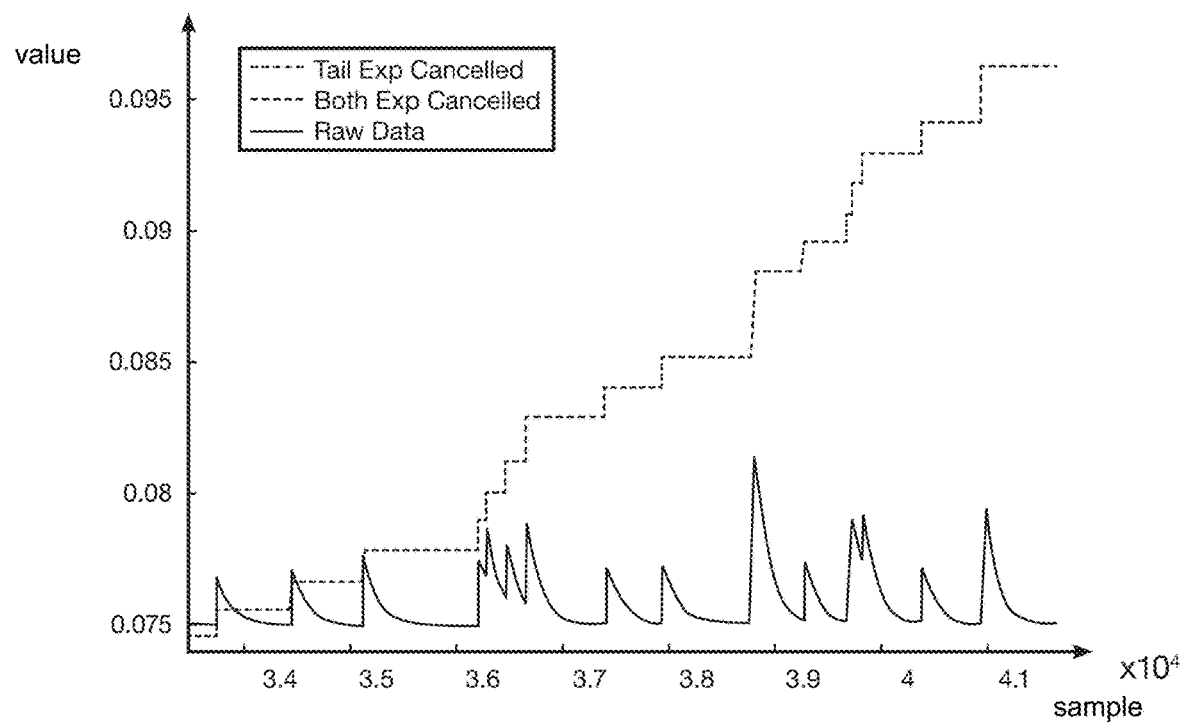
FIGS. 14a and 14b depict exemplary result of transforming detector impulse response data into stepped data (also called integral data) in the pulse shape transformation process.
Figure 14B:
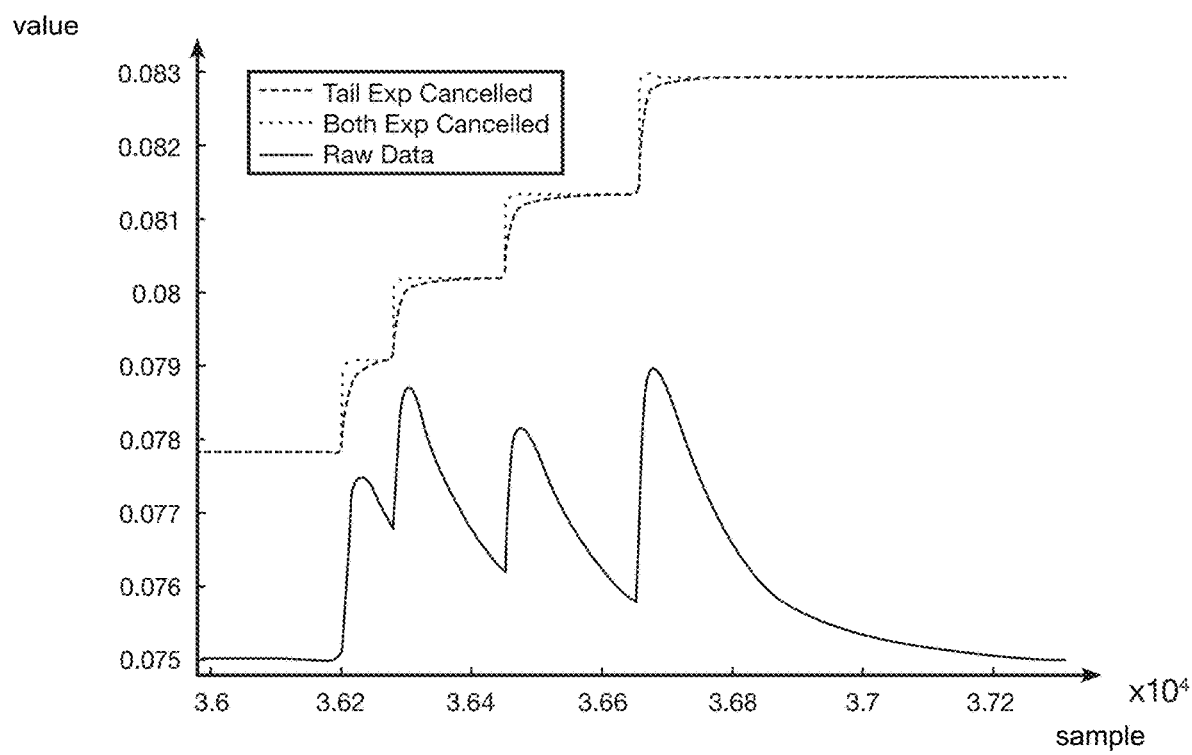

FIGS. 14*a* and 14*b* depict an exemplary result of transforming detector impulse response data into stepped data (also called integral data) in the pulse shape transformation process.

Figure 15:
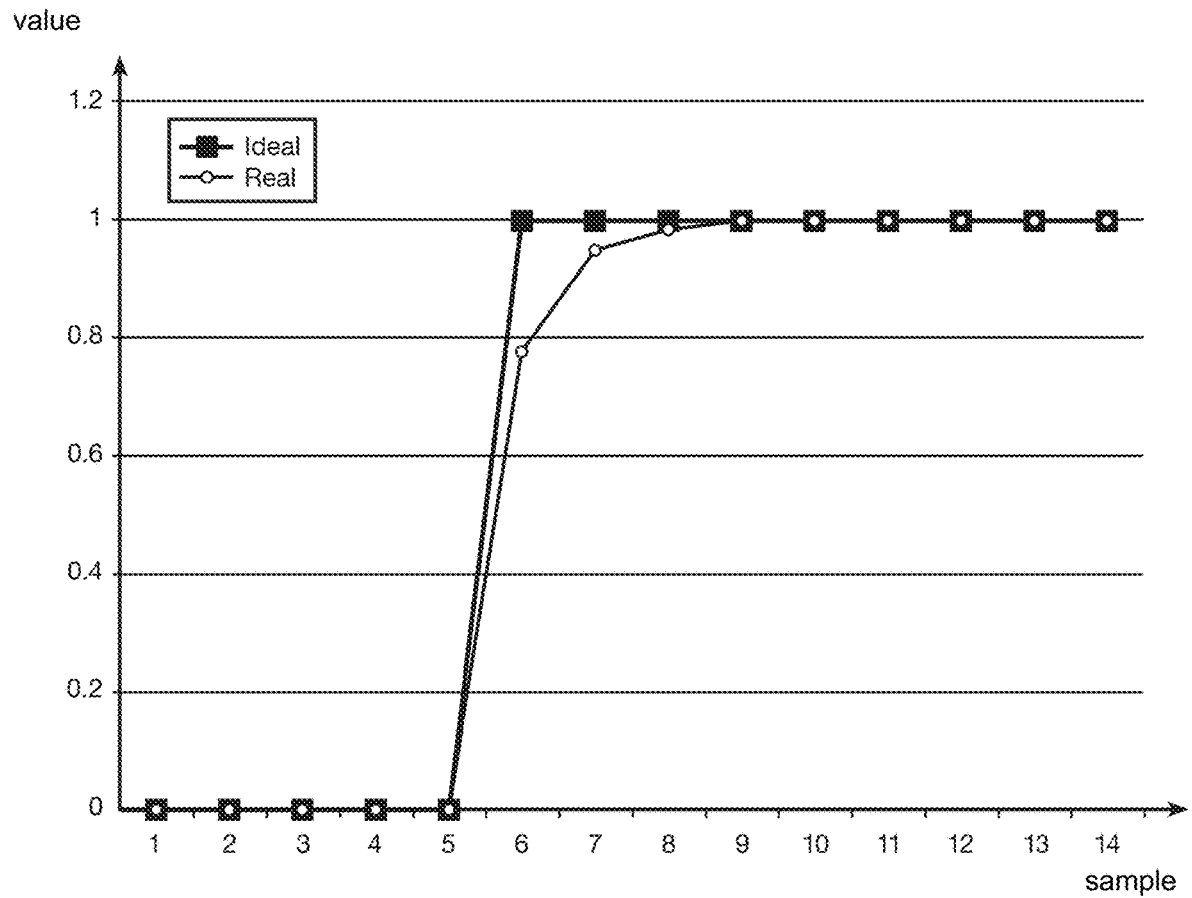
FIG. 15 depicts the rising edge of an exemplary transformed pulse.

Deletion of Samples:

The transformation of the original pulse stream to the ideal step shape (by compressing the rising edge time to zero and extending the falling edge decay time to infinity) is not always possible to attain, due to modelling limitations, second order effects, or limits on resources available for implementing the pulse shape transformation. In particular, FIG. 15 depicts an exemplary rising edge of the transformed pulses occurring over several samples.

In order to obtain the advantage in computational reduction that the ideally transformed pulse shape would provide, calculations may be slightly modified. One desirable modification ensures the rising edge region of each pulse (where the real transformed pulse data differs from the ideally transformed pulse) is excluded from the calculations. While the curved shape could theoretically be modelled, this would be computationally expensive, and as a more desirable option, deleting samples within a set window around the rising edge avoids issues arising from the un-modelled pulse rise time, and also any errors in the time of arrival estimation. If too many samples are deleted, pile up can become an issue again, and if too few samples are deleted, there may still be some pulse transition included in the computation, leading to estimation errors. By deleting those portions of the data stream, the amplitude estimates can be performed as though the transformation had been ideal, while any degradation in the result is minor. If one or more events arrive during the deleted region of a first event, the deleted region is extended to cover all overlapping deleted regions of the events in the cluster. The cluster is treated as a single event, but is flagged as pile-up.

Signal Detection

The transformed data stream data is then analyzed for the presence of pulses. The detection of signals in the digitized detector waveform is accomplished by fitting a "detection metric" model to a fixed number of data points. This fixed length "detection window" is rolled continuously through the digitized detector data. Detection window sizes may vary from four to more than 128 samples, however, optimal window size is between four and 64 samples due to the processing costs of using more than 64 samples.

The detection is implemented by performing a least-squares fit of the expected pulse shape with one or more sliding window segments of the data. The term "sliding window" generally refers to an iterative process of performing in mathematical computations on finite length segments (e.g., windows) of the data. The mathematical computations are sequentially performed on the windows and each window may overlap with adjacent windows. In some embodiments, two adjacent windows may differ by as little as one sample at the start and ends points thereof. In the present embodiment, the estimated parameter fit (at each window location) may be used as a detection metric.

The least-squares estimator for fitting the expected pulse shape with the window segment is given by:

$$\hat{x}(k) = (A^T \cdot A)^{-1} \cdot A^T \cdot b(k) \qquad (9)$$

Where:
  $x(k)$ is the detection metric for sample 'k'
  $b(k) = [y(k-N/2), \ldots, y(k), \ldots y(k+N/2-1)]^T$ i.e. a segment of the stepped data stream, centred on sample 'k'
  A is the vector of the centred expected pulse shape, As a consequence of the earlier pulse shape transformation process, the transformed pulse shape is closely approximated by a step function. Assuming the pulse shape is already in, or has been transformed to the ideal step-function, allows the computational burden of the implementation to be reduced significantly while only suffering a slight reduction in performance. If the expected pulse shape vector A is a zero-mean step function of length 'N' e.g.:

$$A = [-1, -1, -1, \ldots, -1, 1, 1, 1, 1, \ldots 1]^T \qquad (10)$$

Then it can be observed that:
  the $(A^T A)^{-1}$ term is constant
  the $A^T \cdot b(k)$ term is closely related to the term $A^T \cdot b(k-1)$, and is given by:

$$A^T \cdot b(k+1) = A^T \cdot b(k) + y\left(k + \frac{N}{2}\right) - 2 \cdot y(k) + y\left(k - \frac{N}{2}\right) \qquad (11)$$

Hence the least-squares estimator for fitting the ideal pulse to the stepped data stream can be incrementally updated from the previous estimate using addition or subtraction and simple scaling.

The pulse detection metric is analysed to determine the presence or absence of a pulse. In the case of no pulse present, the detection metric is simply zero meaning noise. As a pulse enters the pulse-detection-metric window, the detection metric increases from zero and reaches a maximum when the pulse is centred in the window, falling back to zero as the pulse leaves the window. If multiple pulses are present in the window, the detection metric exhibits multiple peaks. There are two tests that are combined to detect the presence of a pulse:

1) The first test is a simple noise-threshold test to eliminate false triggering due to noise. The detection metric is compared to a simple threshold. If the metric is less than the threshold, then no pulses are deemed present. If it exceeds the threshold, then one or more pulses may be present. The threshold is set to an appropriate level to ensure the probability of false triggering due to noise is acceptably low. The pulse processing FPGA 756 can determine the probability of false triggering based on, for example, the variance of the noise in the signal. When the pulse processing FPGA 756 sets the threshold based on the variance, the probability may be set to an acceptable level.

2) The second test is a search for significant peaks in the detection metric. This occurs when the slope of the peak changes from positive to negative. In the vicinity of a peak, the detection metric can be modelled by a quadratic approximation. A quadratic approximation is performed of a sliding window segment of the detection metric stream. A state machine may be used to monitor the quadratic coefficients to determine when the detection metric has encountered a peak. Further processing of the quadratic coefficients provides an estimate of the sub-sample time of arrival of the pulse.

If the tests indicate that a peak is present, and is unlikely to have been caused by noise, then a signal detection event is declared. The location of the pulse in the stepped data stream is flagged, and transferred to the Energy Estimator.

Figure 16A:
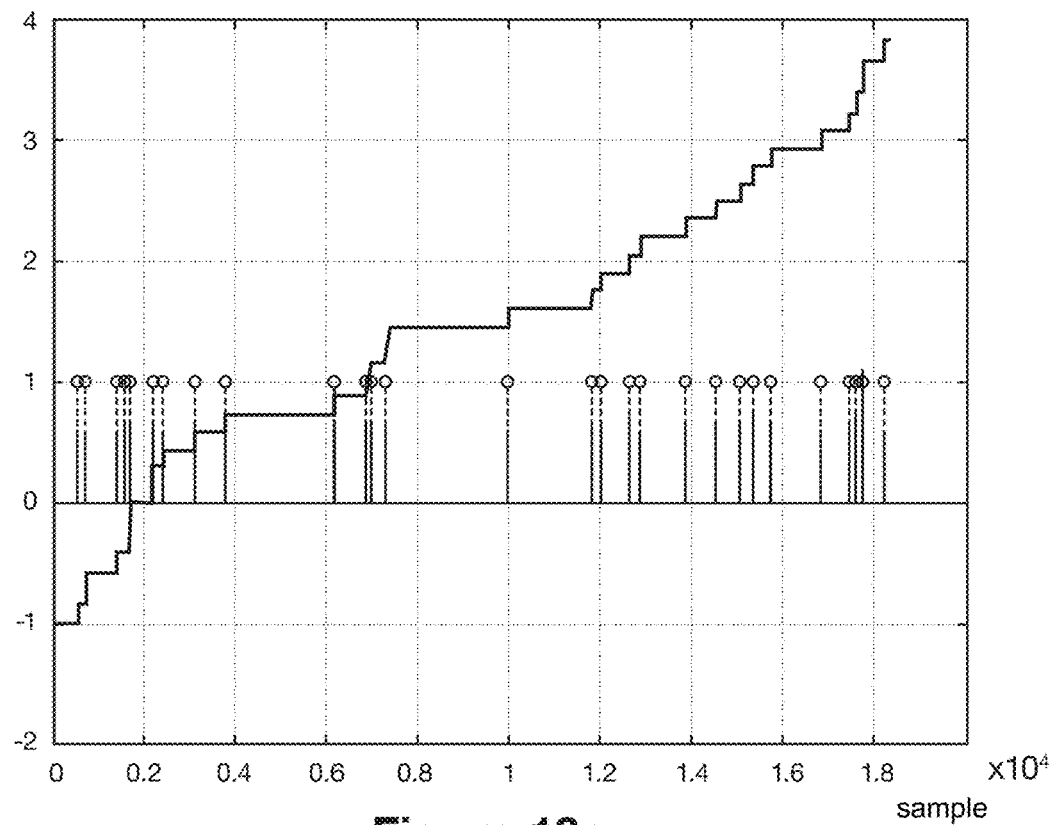
FIGS. 16a and 16b depict the performance of an example detection metric, on data collected from an SDD detector.
Figure 16B:
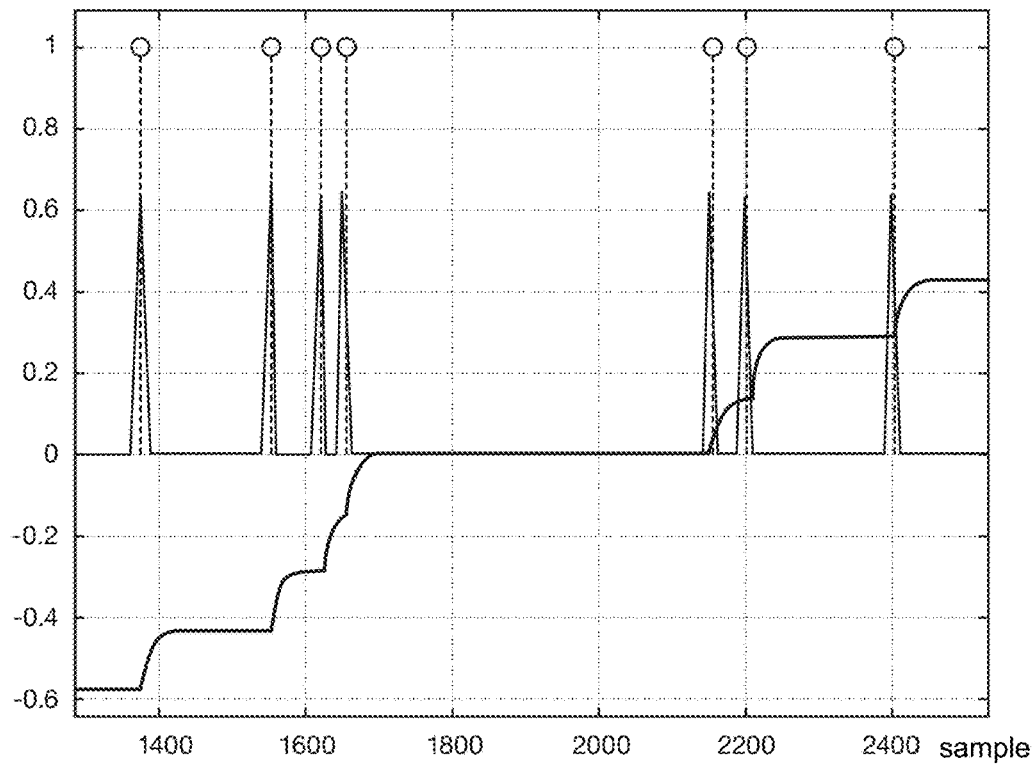

The performance of the detection metric, on data collected from, an SDD detector, is shown in FIGS. 16a and 16b. The detection metric responds rapidly to the arrival of a new signal and decays back down to the steady state value soon after the rising edge of the X-ray has passed. The limit of detection, for two similar sized pulses arriving close to each other is $(N_{DW}/2-1)$ where $N_{DW}$ is the length of the detection window in samples. Using a detection window of 8 samples and a digitization rate of 60 Hz may give a pulse pair detection limit in the order of 50 ns.

The detection algorithm fits a quadratic model to a sliding window of five samples of the detection metric. In order for a peak to be declared, the algorithm examines the decomposition and declares a peak if the curvature is within a permitted range, the constant is over a threshold, and the linear term has change from positive to negative. One embodiment uses five samples for the detection window because this produces a particularly simple FPGA operation: with coefficients of (−2,−1,0,1,2) and (4,1,0,1,4), bit-shifting, which is trivial in an FPGA, may be used. However, any number of samples may be chosen for the detection window.

Pulse Energy Estimation

The estimation of the amplitudes of a group of pulses (with or without pile-up) is performed by a least squares decomposition of a section of the stepped data stream according to the equation:

$$\hat{x}(A^T \cdot A)^{-1} \cdot A^T \cdot b \qquad (12)$$

Where:
  b is a segment of the stepped data stream
  A is a system matrix of the form described above in Equation 6, whose columns contain the pulse shapes, aligned to the expected pulse locations as determined by the pulse detection processing, and
  x is the estimate of the amplitudes of the pulses.

Figure 23:
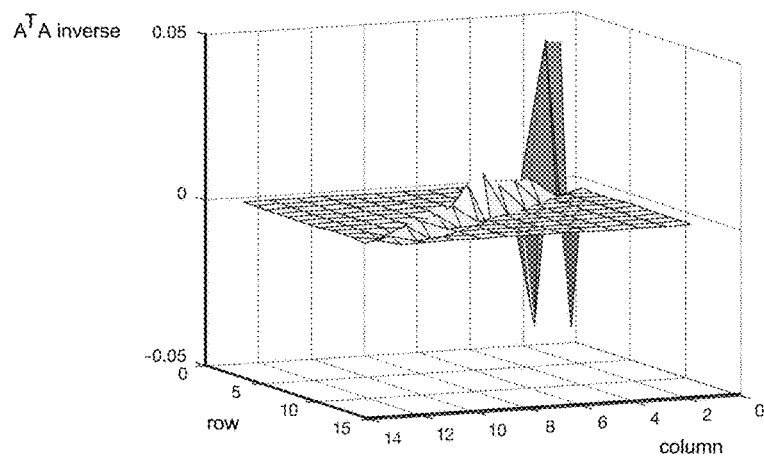
FIG. 23 depicts the structure of the inverse of $(A^{T}A)$.

When the rising edge of the pulse has been compressed to near zero time and the decay time of the pulse shape extends to infinity, the system matrix A is of the form such that $(A^T \cdot A)^{-1}$ is band-diagonal with a narrow bandwidth, as shown in FIG. 23. Pile-up terms are largely decoupled from all but the immediate neighbouring pulses. The non-zero terms of $(A^T \cdot A)^{-1}$ can be determined analytically. This allows a significant reduction in computational burden and implementation complexity.

The resulting amplitude estimate for a given pulse becomes equal to the average value of the stepped data stream after the pulse has arrived (but before the next pulse), less the average value of the stepped data stream prior to the rising edge of the pulse (but after the arrival of the prior pulse).

Accumulation Length:

There are advantages to limiting the number of samples included in the amplitude estimate calculation, rather than using the full length of data between a given pulse and its two immediate neighbours to estimate the amplitude of the pulse. Degradation of resolution due to low-frequency noise, DC offsets and count rate are reduced by limiting the data used in an estimate to a maximum number of samples ('N') immediately on either side of a signal.

If a signal occurs closer than 'N' samples on either side of the signal of interest, then the number of samples available for that portion of the calculation will be less than 'N'. In one embodiment, for a signal amplitude estimate to be considered acceptable there must be greater than a minimum number of samples included in the calculation. This ensures that the variance of the estimate due to noise has been reduced to a desired level. Pulses that arrive closer than the minimum threshold are discarded in order to preserve the resolution of the output spectra. This may have the effect of increasing dead time as count-rate increases.

Once the amplitude estimates are made, further validation, rejection, formatting and presentation of the data can be performed.

Validation

The final stage of the real-time, signal-processing algorithm is the validation stage. At this stage all the parameters that have been estimated by previous algorithmic stages (pulse shape, number of events, time of arrival and event energy) are combined to reconstruct a 'noise-free' model of the detector data. The pulse processing FPGA 756 constructs the noise-free model by placing the calculated parameters into the model of the detector output y(t). For example, in one embodiment, the pulse processing FPGA 756 combines the detector impulse response d(t), unknown energy (α) and unknown time of arrival (τ) to model the detector output y(t) using equation (2). In another embodiment, the pulse processing FPGA 756 models the form of the detector impulse response d(t) based on p(t) shown in equation (7) which the pulse processing FPGA 756 then substitutes into equation (2) to reconstruct the model y(t). By subtracting this model of the detector data from the actual digitized detector time series, the pulse processing FPGA 756 can determine the accuracy of the estimated parameters. Much like examining the residual from a straight-line fit of a data set, if the magnitude of the residuals is small, the parameters well describe the data. However, if at any point large residuals are observed, the detector data has been poorly estimated and that portion of the data can be rejected.

The most common form of errors detected by the validation stage are errors in estimation of the number of events in the data stream. When two events arrive with <50 ns separation they will register as a single event. However this error will cause a "blip" in the residual signal and the poorly estimated events can be discarded.

Spectrum Generation

Once processing of the detector data is complete, the data is compiled into a histogram, representing the spectrum of energies estimated for all detection events identified in the data.

The method of the invention of estimating variance compared to underlying noise in order to accept or reject each detection event is a more accurate and controllable one than prior art methods. In some implementations, it is possible to sort all variance estimates from a particular data collection period and only use the best 80%. This fixes dead-time at 20% and ensures only the best estimates (for a given throughput) are used in the spectrum. By altering the variance or acceptable events, it is very straightforward to adjust the dead time and achieve an improved spectrum.

An important benefit of undertaking processing in the integral space is the structure of the system matrix, A. The simple band-diagonal nature of $inv(A^T A)$ (with a narrow bandwidth as shown in FIG. 23) may enable more accurate and/or robust inversion via QR decomposition or Single Value decomposition (SVD). Alternately, it may be possible to compute the inverse and/or use lookup tables once the shape, number and relative position of the events has been determined. This approach would be extremely hardware efficient.

An important benefit of undertaking the full SVD matrix inversion is the ability to extract valiance estimates, or 'degrees-of-confidence', about the energy of the X-rays being detected. The amplitudes of the entries in $inv(A^T A)$ are illustrative of the variance in the estimate of the X-ray energy. Events where the X-ray energy is known with greater confidence will have smaller entries in the band diagonal.

Advantages of Signal Processing

Implementing the present algorithm has a number of advantages including:
- a lower computational burden, using the same hardware but to achieve more;
- enabling a faster ADC sampling rate or running multiple channels;
- both higher input and output count rate;
- potential to detect very low energy events;
- error bars on energy estimates to help maintain constant resolution;
- enabling better energy resolution/rate performance, and;
- addressing multiple forms in large detectors.

Alternative Signal Processing Method

The embodiments described above represent one signal processing method according to the present invention. However, alternate methods may also be implemented that use similar concepts to that detailed in the above described embodiments with varied implementation.

Figure 17:
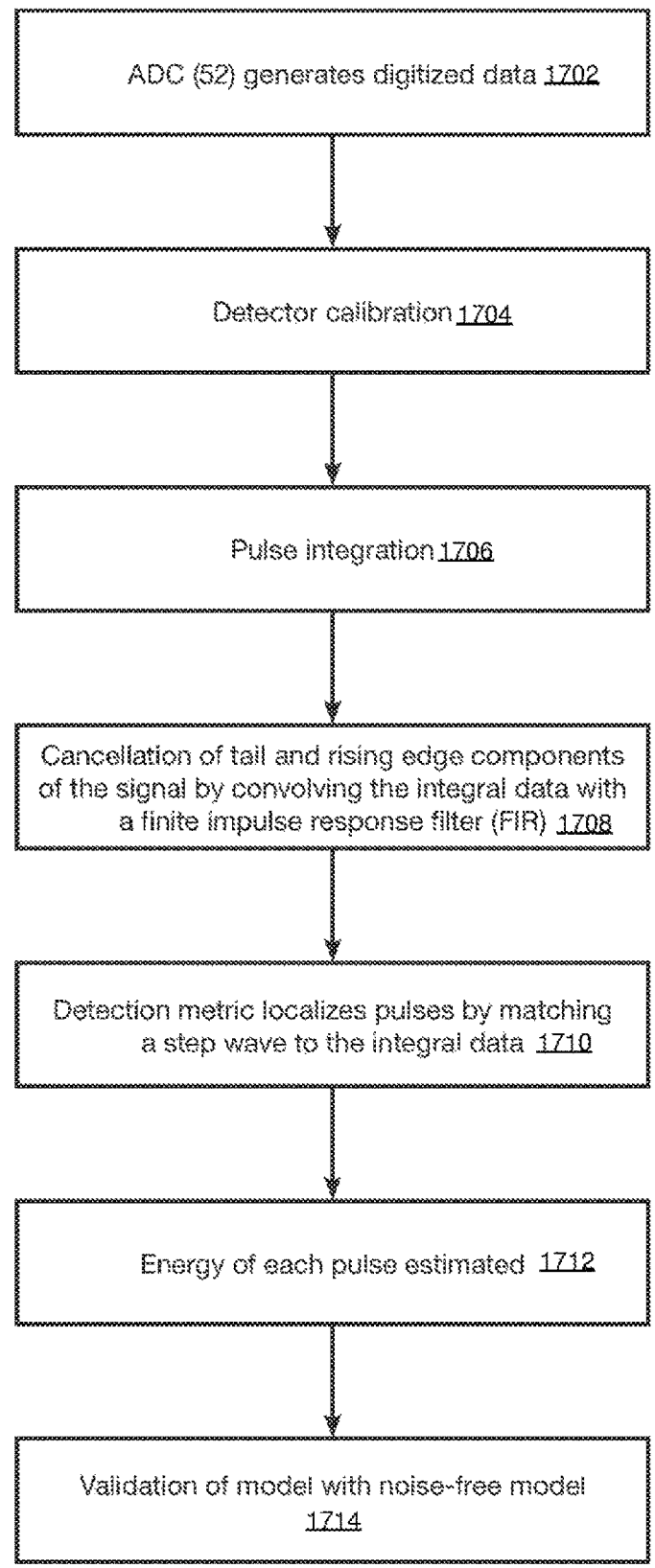
FIG. 17 depicts an exemplary process for validation of a detector output model generated from a pulse pile-up recovery processes according to one embodiment of the invention.

Within the initial data processing stage, a variant of the pulse transformation stage may be conducted that results in a similar stepped data output, though with more complex processing, FIG. 17 depicts an exemplary process for validation of a detector output model generated from a pulse pile-up recovery processes according to one embodiment of the invention. A finite impulse response filter (FIR) is convolved with the integrated detector data as depicted in FIG. 17. This operation may perform at least one of and desirably both of, extension of the exponentially decaying tail component to a decay time of 'infinity', and compression of the rising edge component to a decay time of zero. This results in a much sharper edge upon which to obtain accurate pulse arrival time estimates, and leads to overall improvement in pulse energy estimation through accurate sub-sample time of arrival estimation.

With reference to FIG. 17, a process for generating a detector output model and validating the model will be described. In block 1702, the ADC 1006 generates digitized data x[n] (see FIG. 10). In block 1704, the pulse processing FPGA 756 calibrates the radiation detector 750. In block 1706, the pulse processing FPGA 756 integrates the digitized data x[n]. In block 1708, the pulse processing FPGA 756 convolves the integrated signal with a finite impulse response filter (FIR) so as to cancel the tail and rising edge components of the signal. In block 1710, the pulse processing FPGA 756 localizes the pulses using a detection metric to match a step wave to the integral data. In block 1712, the pulse processing FPGA 756 estimates the energy and/or other parameters of interest of the detected pulses. In block 1714, the pulse processing FPGA 756 estimates a model based on the parameters and validates the model.

Processing of the data in which either the trailing exponent may have been extended to infinity, and/or the using edge may have been compressed, leads to significant efficiency savings in the matrix computation compared to prior art methods. This method may have been brought about through attempting to achieve the greatest possible simplification in the pulse energy estimation algorithm, however, it may not be as efficient as the embodiment described above.

For the instant signal-processing alternative, the following parameters may for example be varied to control output data characteristics:
1) Integration window: The maximum number of samples for which the energy is integrated. The integration window is reduced where the spacing between pulses does not permit the full window.
2) Integration Factor, which controls the maximum variance.

The maximum variance is set to the Integration Factor>1. Integration Factor=1, the maximum variance is 2/IntLength, and so pulses are accepted only if the energy on either side of the rising edge can be integrated for exactly IntegrationLength samples. As the factor is increased, pulses for which the integration window is shorter can be included in the validated data. This increases the available output count rate, with a likely penalty in energy resolution, and also a penalty that is likely to vary with count rate—at higher count rate it is more likely the pulses will be too close to achieve the specified maximum integration length.

Figure 18A:
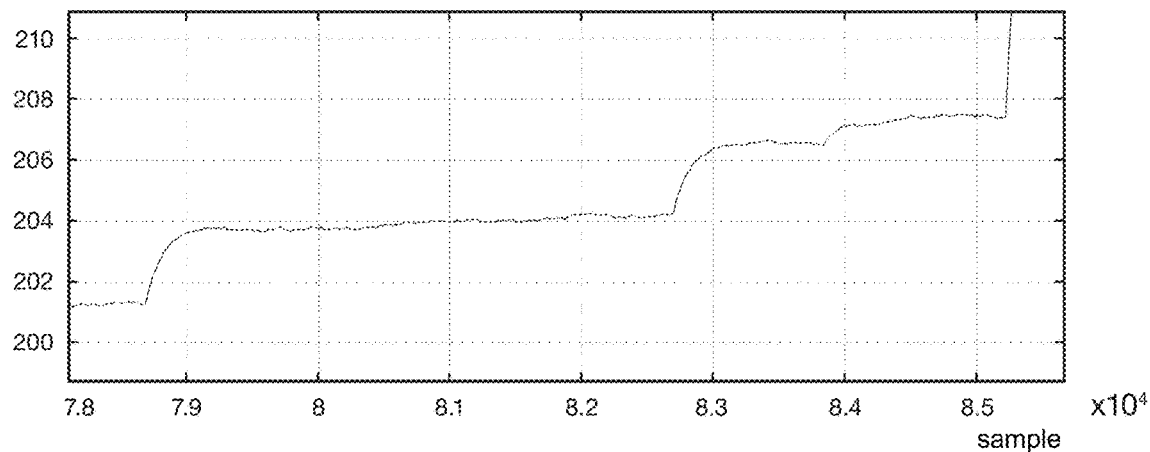
FIGS. 18a, 18b, and 18c depict one example in which a finite response filter is convolved, with integrated detector data.
Figure 18B:
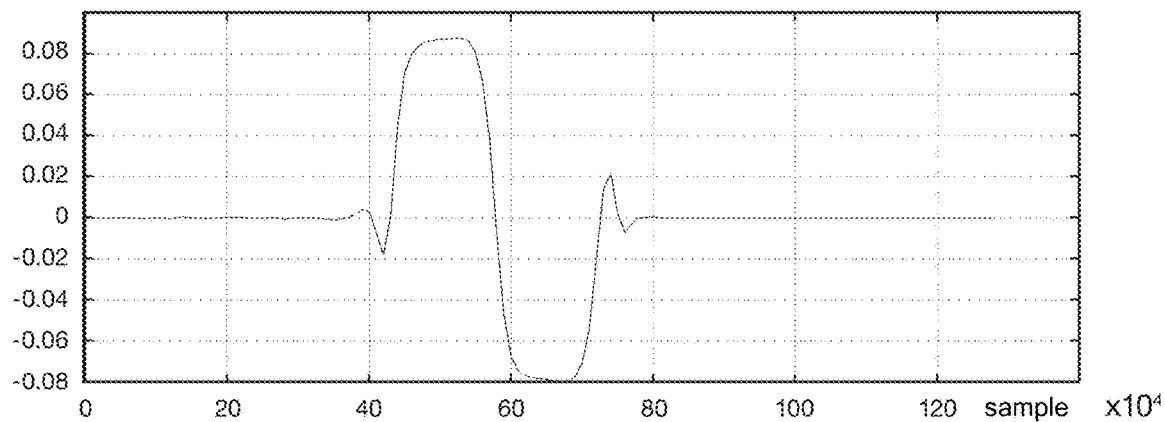
Figure 18C:
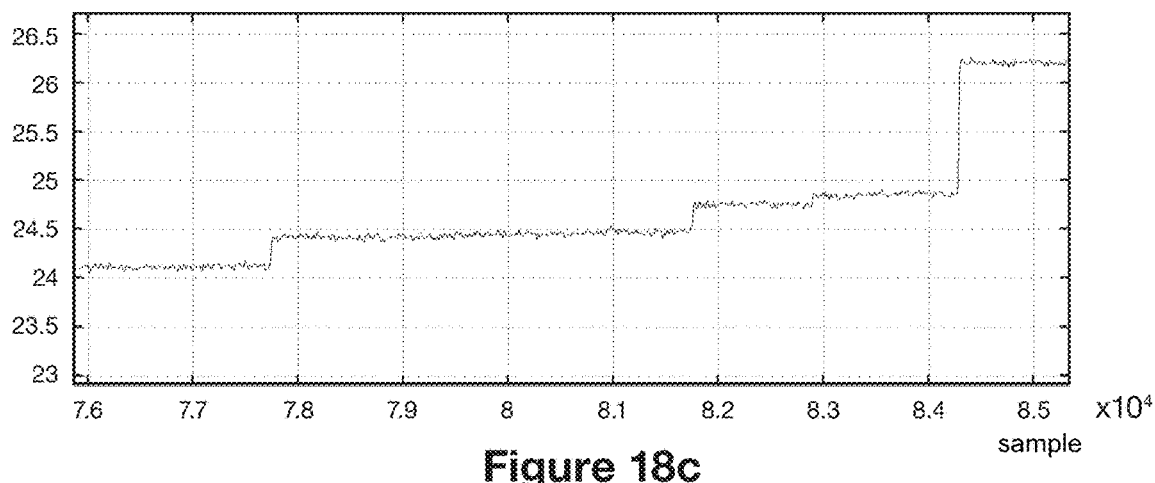

FIG. 18 shows exemplary waveforms formed at various stages of the pulse processing of detector data performed by the pulse processing FPGA 756 according to the present embodiment. FIG. 18a illustrates exemplary output of the pulse processing FPGA 756 at pulse integration block 1706. FIG. 18b illustrates exemplary coefficients of an FIR filter used by the pulse processing FPGA 756 in block 1708. FIG. 18c illustrates exemplary output of the pulse processing FPGA 756 at block 1708 after the pulse processing FPGA 756 convolves the integrated signal with the FIR filter coefficients of FIG. 18b. It can be seen that the processing sequence performed by the pulse processing FPGA 756 has the same effect as compressing the rising edge, while extending the falling edge toward infinity.

Figure 19:
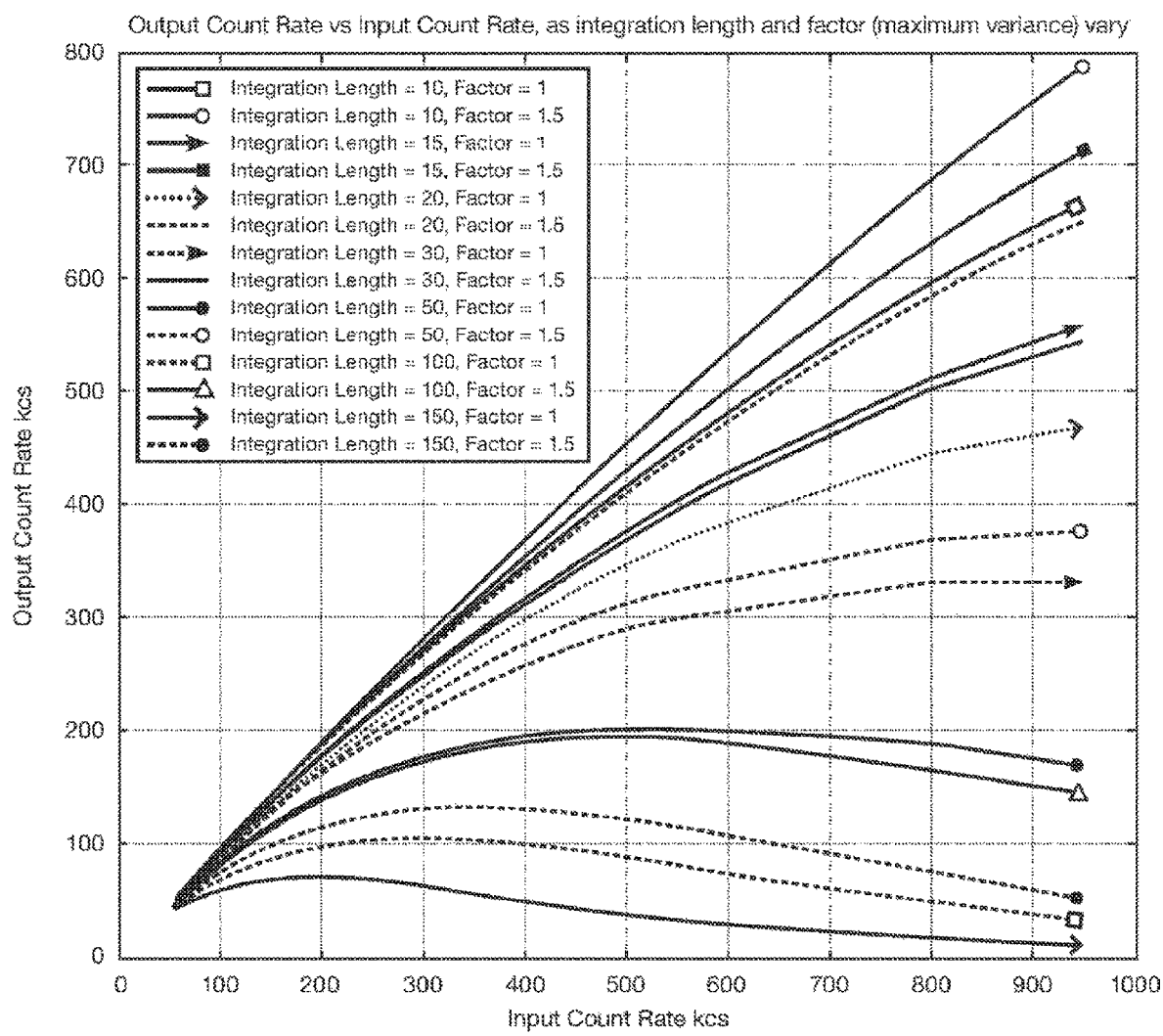
FIG. 19 shows an exemplary plot of the output count rate against input count rate as integration length and integration factor are varied in the pulse pile-up recovery process according to an embodiment.

FIG. 19 shows an exemplary plot of the output count rate against input count rate as integration length and integration factor are varied in the pulse pile-up recovery process according to an embodiment. There are at least two trends: as integration length is increased, available count rate decreases, and as integration factor is increased, the available count rate increases.

It is noted that even for moderate integration lengths, the dead time quickly approaches 50%. This is a substantially worse result than if the integration length was not limited, and the dead time was fixed at 10%. Furthermore, as integration length increases, FWHM also increases (resulting in energy resolution degradation) and shifts in peak location. This is significant Sine integration length may influence energy resolution but it may require calibration to correct for peak shifts.

Regarding integration factor, FWHM varies slightly as the integration factor increases from 1 to 1.5, allowing more pulses to be accepted. The result suggests a factor greater than 1.0 should be considered to increase the available count rate without dramatic degradation in FWHM.

Figure 20:
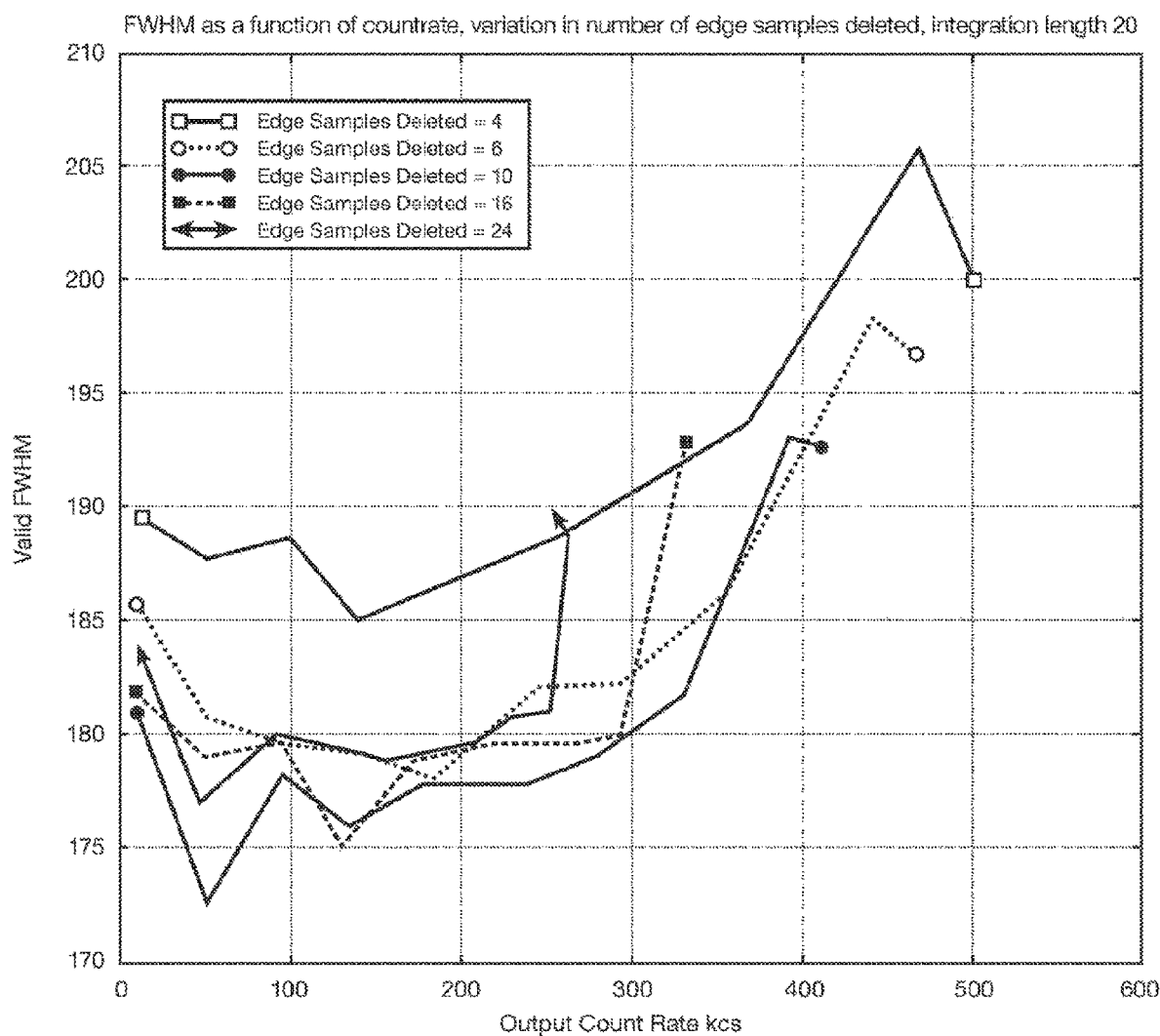
FIG. 20 demonstrates an exemplary optimization of the frill width of the main peak at half its maximum value (FWHM) that can be achieved by altering the number of deleted samples in the pulse pile-up recovery process according to an embodiment.

Regarding the deletion of samples within a set window around the rising edge, FIG. 20 demonstrates an exemplary optimisation of FWHM that can be achieved by altering the number of deleted samples in the pulse pile-up recovery process according to one embodiment. The degradation of FWHM is clear in the case of deletion of four samples, hence the optimal number for deletion is around six to ten. Above 10, there is not significant improvement in FWHM and the maximum available count rate degrades.

Both extension of the tail and compression of the rising edge are desirable for optimal processing to ensure the maximum simplification of the signal to approximate a step function; however there are some situations where one or the other would not be essential. In some implementations, if the rising edge decays quickly compared to the sample rate—such as for a LYSO detector crystal, single-exponential-decay pulses, or slow ADC sample rates—then front-edge-compression may not be necessary. Likewise, for very slow decay pulses—such as detectors sitting in liquid nitrogen, or a with a very large capacitor—the decay tail will be very long already, and may not need to be extended to infinity given its similarity to a desirable pulse form.

Figure 21:
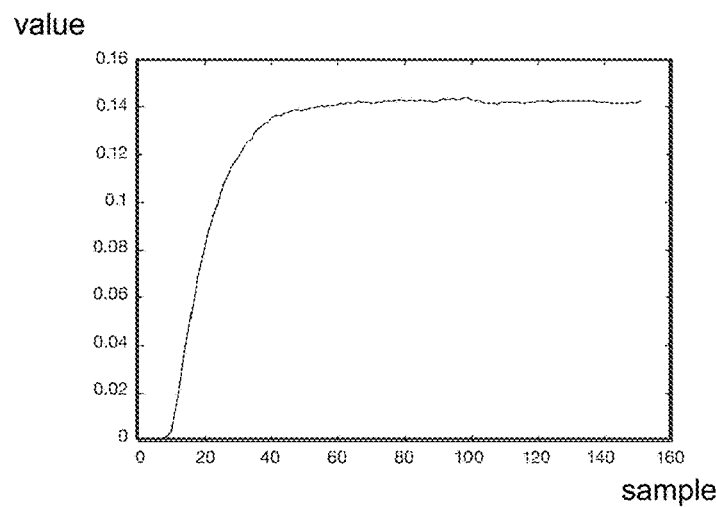
FIG. 21 depicts an exemplary pulse structure.
Figure 22:
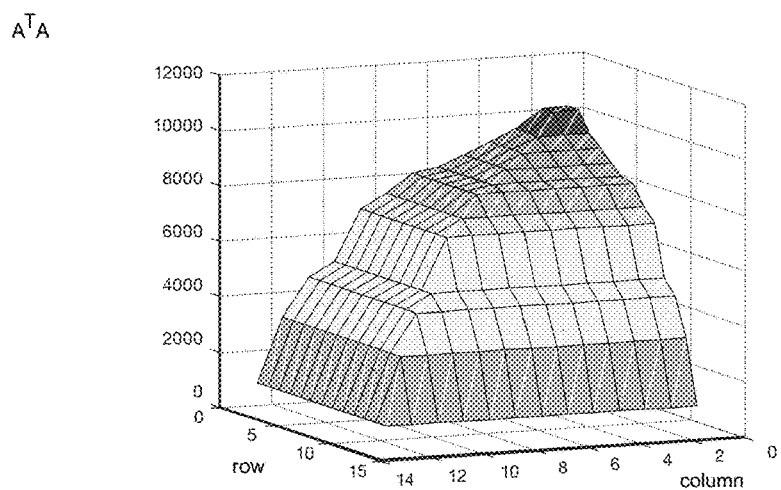
FIG. 22 depicts an exemplary matrix structure of $(A^{T}A)$ associated with the arrival of multiple pulses in the detector data, for example as depicted in FIG. 16a, where the system matrix is represented by A. The matrix which requires inversion, $A^{T}A)$, is a square matrix where the number of rows equal to the number of signals in a given frame of data.

Cancelling the trailing exponent leads to a pulse shape approximating as step function, but a rise time governed by the pre-existing rise-time of the detector and electronics. This can still be many tens of samples, and lead to overlap. FIG. 21 depicts an exemplary pulse structure. In this example the rise-time is in the order of 50 samples, which still leads to significant possibility of pulse overlap and failure to distinguish piled-up pulses. In this case, the structure of $A^T A$ is illustrated in FIG. 22. The data in each row to the left of the main diagonal are approximately constant, reducing slightly on the diagonal, and then falling after the diagonal. However, in some implementations, when pulses overlap (are closer than about 50-60 samples), there are still many off-diagonal elements. The inverse of $A^T A$ has as band diagonal structure illustrated in FIG. 23, with a bandwidth in the order of 2-5, depending on how many pulses overlap.

It is convenient to describe the invention herein in relation to particularly preferred embodiments. However, the invention is applicable to a wide range of implementations and it is to be appreciated that other constructions and arrangements are also considered as falling within the scope of the invention. Various modifications, alterations, variations and or additions to the construction and arrangements described herein are also considered as falling within the ambit and scope of the present invention.

Information and signals may be represented using any of a variety of different technologies and techniques. For example, data, instructions, commands, information, signals, bits, symbols, and chips that may be referenced throughout the above description my be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described, in connection, with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors m conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one ad vantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for identifying and measuring individual radiation particles comprising:
a radiation detector configured to receive a plurality of individual radiation particles and generate detector output data in the form of a stream of digital samples, the detector output data comprising a plurality of individual pulse signals corresponding to the individual radiation particles, some of which are overlapping, each of the individual pulse signals having a pulse shape with a rising edge and a falling edge above a baseline; and
a processing circuit configured to:
receive the detector output data;
transform the detector output data such that the rising edge of each of the individual pulse signals is compressed in the time domain and the falling edge of each of the individual pulse signals is extended in the time domain so as to produce digital stepped data comprising a transformed stream of samples approximating an ideal step function, by modeling each of the individual pulse signals using a falling edge variable and a rising edge variable, transforming the rising edge variable such that the rising time of each of the individual pulse signals is substantially zero, and transforming the falling edge variable such that the falling time of each of the individual pulse signals is substantially infinite, wherein the digital stepped data is produced without having previously determined an energy of each of the individual pulse signals;
identify each of the individual pulse signals using the digital stepped data; and
determine one or more of the energy or the time of arrival of each of the identified individual pulse signals using the digital stepped data,
wherein the processing circuit is further configured to transform the detector output data using the following operation:

$$y(k)=y(k-1)+x(k)-x(k-1)\cdot(e^{-a}+e^{-b})+x(k-2)\cdot e^{-a}\cdot e^{-b}$$

where:
x(n) is a value of the received detector output data stream at sample 'n',
a, b determine the falling and rising edges of the pulse shape with a double exponential waveform, and
y(n) is the digital stepped data.

2. The apparatus of claim 1, wherein the processing circuit is further configured to:
determine the energy of each of the individual pulse signals using the difference between an average value of the digital stepped data following the signal and an average value of the digital stepped data prior to the signal.

3. The apparatus of claim 2, wherein the processing circuit is further configured to:
generate a model of the detector output data using the energy of each of the individual pulse signals;
determine the difference between the model and the detector output data; and
reject portions of the detector output data that differ from the model by more than a threshold.

4. The apparatus of claim 1, wherein the double-exponential waveform is given by:

$$p(t)=A\cdot(e^{-at}-e^{-bt})$$

where:
p(t) is the individual pulse signal,
A is the energy of the individual pulse signal,
a is the rising edge variable, and
b is the falling edge variable.

5. The apparatus of claim 1, wherein the processing circuit is further configured to delete at least one of the samples in the digital stepped data within a window surrounding the rising edge of one of the individual pulse signals.

6. The apparatus of claim 1, wherein the processing circuit is further configured to identify each of the individual pulse signals by:
determining one or more detection metrics, wherein the one or more detection metrics are determined by fitting an expected signal shape to one or more sliding windows of samples in the digital stepped data, and estimating a parameter fit between the expected signal shape and the digital stepped data for each window;
analyzing one or more of the detection metrics; and
determining if there are any signals in the digital stepped data using said analysis of the one or more detection metrics.

7. The apparatus of claim 6, wherein the processing circuit is further configured to analyze one or more of the detection metrics by:
comparing one or more detection metrics to a threshold; or,
modeling one or more of the detection metrics with a quadratic approximation applied to one or more sliding windows of the detection metric data, and comparing quadratic coefficients of a plurality of sliding windows of the detection metric.

8. The apparatus of claim 6, wherein the processing circuit is further configured to determine the one or more detection metrics using a least-squares fit of the expected signal shape with the digital stepped data, where the detection for a sample k is given by:

$$\hat{x}(k)=(A^T\cdot A)^{-1}\cdot A^T\cdot b(k)$$

where: k is the sample,
x(k) is the detection metric for the sample k,
b(k) is a segment of the stepped data, centered on the sample k, and
A is a centered vector of the expected signal shape.

9. The apparatus of claim 6, wherein the processing circuit is further configured to incrementally update the one or more detection metric from a detection metric for an earlier sample using addition, subtraction, and/or scaling.

10. The apparatus of claim 1, wherein the processing circuit is further configured to discard signals which are separated from each of the individual pulse signals in the digital stepped data by less than a threshold number of samples.

11. The apparatus of claim 1, wherein the processing circuit is further configured to transform the detector output data using convolution of a finite impulse response filter (FIR) with the detector output data after integration.

12. A method for identifying and measuring individual radiation particles comprising:
receiving a plurality of individual radiation particles in a radiation detector and generating detector output data in the form of a stream of digital samples, the detector output data comprising a plurality of individual pulse signals corresponding to the individual radiation particles, some of which are overlapping, each individual pulse signal having a pulse shape with a rising edge and a falling edge above a baseline;
receiving the detector output data;
transforming the detector output data such that the rising edge of each individual pulse signal is compressed in the time domain and the falling edge of each individual pulse signal is extended in the time domain so as to produce digital stepped data comprising a transformed stream of samples approximating an ideal step function, by modeling each of the individual pulse signals using a rising edge variable and a falling edge variable, transforming the rising edge variable such that the rising time of each of the individual pulse signals is substantially zero, and transforming the falling edge variable such that the falling time of each of the individual pulse signals is substantially infinite, wherein the digital stepped data is produced without having previously identified each of the individual pulse signals and without having previously determined an energy of each of the individual pulse signals;
identifying each of the individual pulse signals using the digital stepped data; and
determining one or more of the energy or the time of arrival of each of the identified individual pulse signals using the digital stepped data,
wherein the transforming of the detector output data is performed using the following operation:

$$y(k)=y(k-1)+x(k)-x(k-1)\cdot(e^{-a}+e^{-b})+x(k-2)\cdot e^{-a}\cdot e^{-b}$$

where:
x(n) is a value of the received detector output data stream at sample 'n',
a, b determine the falling and rising edges of the pulse shape with a double exponential waveform, and
y(n) is the digital stepped data.

13. The method of claim 12, further comprising:
determining the energy of each of the individual pulse signals using the difference between an average value of the digital stepped data following the signal and an average value of the digital stepped data prior to the signal.

14. The method of claim 12, further comprising:
generating a model of the detector output data using the energy of each of the individual pulse signals;
determining the difference between the model and the detector output data; and
rejecting portions of the detector output data that differ from the model by more than a threshold.

15. The method of claim 12, further comprising:
deleting at least one of the samples in the digital stepped data within a window surrounding the rising edge of one of the individual pulse signals.

16. The method of claim 12, further comprising:
determining one or more detection metrics, wherein the one or more detection metrics are determined by fitting an expected signal shape to one or more sliding windows of samples in the digital stepped data and estimating a parameter fit between the expected signal shape and the digital stepped data for each window;

analyzing one or more of the detection metrics; and determining if there are any signals in the digital stepped data using said analysis of one or more of the detection metrics.

17. The method of claim 16, wherein the step of analyzing the one or more detection metrics comprises:

comparing one or more of the detection metrics to a threshold; or, modeling one or more of the detection metric with a quadratic approximation applied to one or more sliding windows of the detection metric data, and comparing quadratic coefficients of a plurality of sliding windows of the detection metric.

18. The method of claim 16, wherein the step of determining one or more detection metrics further comprises:

determining the one or more detection metrics using a least-squares fit of the expected signal shape with the digital stepped data, where the detection metric for a sample k is given by:

$$\hat{x}(k)=(A^T \cdot A)^{-1} \cdot A^T \cdot b(k)$$

where: k is the sample, x(k) is the detection metric for the sample k, b(k) is a segment of the digital stepped data, centered on sample k, and A is a centered vector of the expected signal shape.

19. The method of claim 16, further comprising:

incrementally updating the one or more detection metrics from a detection metric for an earlier sample using addition, subtraction, and/or scaling.

20. The method of claim 12, wherein the double-exponential waveform is given by:

$$p(t)=A \cdot (e^{-at}-e^{-bt})$$

where:

p(t) is the individual pulse signal,

A is the individual pulse signal energy, a is the rising edge variable, and b is the falling edge variable.

21. The method of claim 12, wherein the step of transforming the detector output data is performed using convolution of a finite impulse response filter (FIR) with the detector output data after integration.

22. An apparatus, comprising:

means for receiving a plurality of individual radiation particles and generating detector output data in the form of stream of digital samples, the detector output data comprising a plurality of individual pulse signals corresponding to the individual radiation particles, some of which are overlapping, each individual pulse signal having a pulse shape with a rising edge and a falling edge above a baseline;

means for receiving the detector output data;

means for transforming the detector output data such that the rising edge of each individual pulse signal is compressed in the time domain and the falling edge of each individual pulse signal is extended in the time domain so as to produce digital stepped data comprising a transformed stream of samples approximating an ideal step function, by modeling each of the individual pulse signals using a rising edge variable and a falling edge variable, transforming the rising edge variable such that the rising time of each of the individual pulse signals is substantially zero, and transforming the falling edge variable such that the falling time of each of the individual pulse signals is substantially infinite, wherein the digital stepped data is produced without having previously identified each of the individual pulse signals and without having previously determined an energy of each the individual pulse signals;

means for identifying each of the individual pulse signals using the digital stepped data; and means for determining one or more of the energy or the time of arrival of each of the identified individual pulse signal using the digital stepped data, wherein the means for transforming is further configured to transform the detector output data using the following operation:

$$y(k)=y(k-1)+x(k)-x(k-1) \cdot (e^{-a}+e^{-b})+x(k-2) \cdot e^{-a} \cdot e^{-b}$$

where:

x(n) is a value of the received detector output data stream at sample 'n', a, b determine the falling and rising edges of the pulse shape with a double exponential waveform, and y(n) is the digital stepped data.

23. The apparatus of claim 22, further comprising:

means for determining the energy of each of the individual pulse signals using the difference between an average value of the digital stepped data following the signal and an average value of the digital stepped data prior to the signal.

24. The apparatus of claim 22, further comprising:

means for generating a model of the detector output data using the energy of each of the individual pulse signals;

means for determining the difference between the model and the detector output data; and means for rejecting portions of the detector output data that differ from the model by more than a threshold.

25. The apparatus of claim 22, further comprising:

means for deleting at least one of the samples in the digital stepped data within a set window surrounding the rising edge of one of the individual pulse signals.

26. The apparatus of claim 22, wherein the means for identifying each individual pulse signal further comprises:

means for determining one or more detection metrics, wherein the one or more detection metrics are determined by fitting an expected signal shape to one or more sliding windows of samples in the digital stepped data and estimating a parameter fit between the expected signal shape and the digital stepped data for each window;

means for analyzing one or more of the detection metrics; and means for determining if there are any signals in the digital stepped data using said analysis of one or more detection metrics.

27. The apparatus of claim 26, wherein the means for analyzing one or more of the detection metrics further comprises:

means for comparing one or more detection metrics to a threshold; or, means for modeling one or more of the detection metrics with a quadratic approximation applied to one or more sliding windows of the detection metric data, and comparing quadratic coefficients of a plurality of sliding windows of the detection metric.

28. The apparatus of claim 26, wherein:

means for determining the one or more detection metrics is uses a least-squares fit of the expected signal shape with the digital stepped data, where the detection metrics for a sample k is given by:

$$\hat{x}(k)=(A^T \cdot A)^{-1} \cdot A^T \cdot b(k)$$

where: k is the sample, x(k) is the detection metric for sample k, b(k) is a segment of the digital stepped data, centered on sample k, and A is a centered vector of the expected signal shape.

29. The apparatus of claim 26, further comprising:
means for incrementally updating the one or more detection metrics from a detection metric for an earlier sample using addition, subtraction, and/or scaling.

30. The apparatus of claim 22, wherein the double-exponential waveform is given by:

$$p(t) = A \cdot (e^{-at} - e^{-bt})$$

where:
p(t) is the individual pulse signal,
A is the individual pulse signal energy,
a is the rising edge variable, and
b is the falling edge variable.

31. The apparatus of claim 22, wherein the means for transforming the detector output data uses convolution of a finite impulse response filter (FIR) with the detector output data after integration.

* * * * *